(12) United States Patent
Kake

(10) Patent No.: US 9,411,483 B2
(45) Date of Patent: Aug. 9, 2016

(54) USER INTERFACE FOR PROCESSING DATA BY UTILIZING ATTRIBUTE INFORMATION ON DATA

(75) Inventor: Tomokazu Kake, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 1324 days.

(21) Appl. No.: 12/018,368

(22) Filed: Jan. 23, 2008

(65) Prior Publication Data

US 2008/0229223 A1    Sep. 18, 2008

(30) Foreign Application Priority Data

Mar. 16, 2007   (JP) ................................. 2007-069490

(51) Int. Cl.
*G06F 3/048*   (2013.01)
*G06F 3/0481*   (2013.01)

(52) U.S. Cl.
CPC .................................. *G06F 3/0481* (2013.01)

(58) Field of Classification Search
USPC ........................................ 715/835, 788, 848
See application file for complete search history.

(56) References Cited

U.S. PATENT DOCUMENTS

| | | | |
|---|---|---|---|
| 6,968,511 B1 * | 11/2005 | Robertson et al. | 715/835 |
| 7,075,550 B2 * | 7/2006 | Bonadio | 345/589 |
| 2005/0138572 A1 * | 6/2005 | Good et al. | 715/805 |

FOREIGN PATENT DOCUMENTS

| | | |
|---|---|---|
| JP | 2001-75954 | 3/2001 |
| JP | 2001-92825 | 4/2001 |
| JP | 2005-4564 | 1/2005 |
| JP | 2006-277291 | 10/2006 |
| JP | 2007-34663 | 2/2007 |
| JP | 2007-47916 | 2/2007 |

OTHER PUBLICATIONS

Notification of Reason(s) for Refusal dated Sep. 25, 2012, from corresponding Japanese Application No. 2007-069490.
Notification of Reason(s) for Refusal dated Mar. 27, 2012, from corresponding Japanese Application No. 2007-069490.

* cited by examiner

*Primary Examiner* — Thanh Vu
(74) *Attorney, Agent, or Firm* — Katten Muchin Rosenman LLP

(57) ABSTRACT

A data processing technology of high convenience is provided. A data processing apparatus includes: a data file storing section which stores data files; a user interface section which assigns first objects to respective data units, displays the first objects on-screen, and accepts an operation on the data units in the form of an operation on the first objects, the data units each being a data file or a group of a plurality of data files stored in the data file storing section; and a grouping section which accepts an operation for instructing to group a plurality of the data units, groups those data units together, and determines attribute information pertaining to contents of the group and attaches it to the group based on pieces of attribute information attached to the respective data units, pertaining to contents of the data units.

12 Claims, 22 Drawing Sheets

FIG.2

| file ID | filename | path | creation date and time | update date and time | size |
|---|---|---|---|---|---|
| 0001 | xxx.bmp | c:¥img¥ | 2006/04/01 10:24:40 | 2006/04/01 10:24:40 | 315kb |
| 0002 | xxx.wav | c:¥music¥ | 2006/04/02 18:31:17 | 2006/04/03 01:55:32 | 1422kb |
| : | : | : | : | : | : |

| exciting | relax | refresh | serious | light | intellec-tual |
|---|---|---|---|---|---|
| 100 | 0 | 50 | 80 | 5 | 20 |
| 5 | 80 | 40 | 0 | 65 | 15 |
| : | : | : | : | : | : |

FIG.3

| group ID | group name | path | file ID | file ID | ‧ ‧ |
|---|---|---|---|---|---|
| 0001 | favorite | - | 0001 | 0036 | ‧ ‧ |
| 0002 | animals | c:¥img¥ | 0244 | 0395 | ‧ ‧ |
| : | : | : | : | : | ‧ ‧ |

| exciting | relax | refresh | serious | light | intellectual |
|---|---|---|---|---|---|
| 100 | 0 | 50 | 80 | 5 | 20 |
| 5 | 80 | 40 | 0 | 65 | 15 |
| : | : | : | : | : | : |

USER INTERFACE FOR PROCESSING DATA BY UTILIZING ATTRIBUTE INFORMATION ON DATA

BACKGROUND OF THE INVENTION

1. Field of the Invention

The present invention relates to data processing technology, and in particular, to a data processing apparatus, a data processing method, and a data processing program which provide a user interface for processing data utilizing attribute information on the data.

2. Description of the Related Art

With the widespread use of digital still cameras and digital video cameras, it has become possible to easily record still images and moving images in the form of digital data. Digital music data, as opposed to analog data, are also in widespread use. The prevalence of the Internet has also made images, music, and other digital data available from web servers and the like.

The establishment of infrastructures for storing, reproducing, and enjoying digital data can result in enormous collections of data, making it difficult to search for desired pieces of data. Accordingly, convenient user interfaces are desirable for managing stored data appropriately.

SUMMARY OF THE INVENTION

The present invention has been achieved in view of the foregoing circumstances. It is thus a general purpose of the present invention to provide data processing technology of higher convenience.

One embodiment of the present invention relates to a data processing apparatus. This data processing apparatus includes: a data file storing section which stores data files; a user interface section which assigns first objects to respective data units, displays the first objects on-screen, and accepts an operation on the data units in the form of an operation on the first objects, the data units each being a data file or a group of a plurality of data files stored in the data file storing section; and a grouping section which accepts an operation for instructing to group a plurality of the data units, groups those data units together, and determines attribute information pertaining to contents of the group and attaches it to the group based on pieces of attribute information attached to the respective data units, pertaining to contents of the data units.

It should be appreciated that arbitrary combinations of the foregoing constituting elements, and implementations of the invention in the form of methods, apparatuses, systems, and the like are also applicable as embodiments of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 2 is a diagram showing an example of internal data in a file database;

FIG. 3 is a diagram showing an example of internal data in a group database;

DETAILED DESCRIPTION OF THE INVENTION

The invention will now be described by reference to the preferred embodiment. This does not intend to limit the scope of the present invention, but to exemplify the invention.

Figure 1:
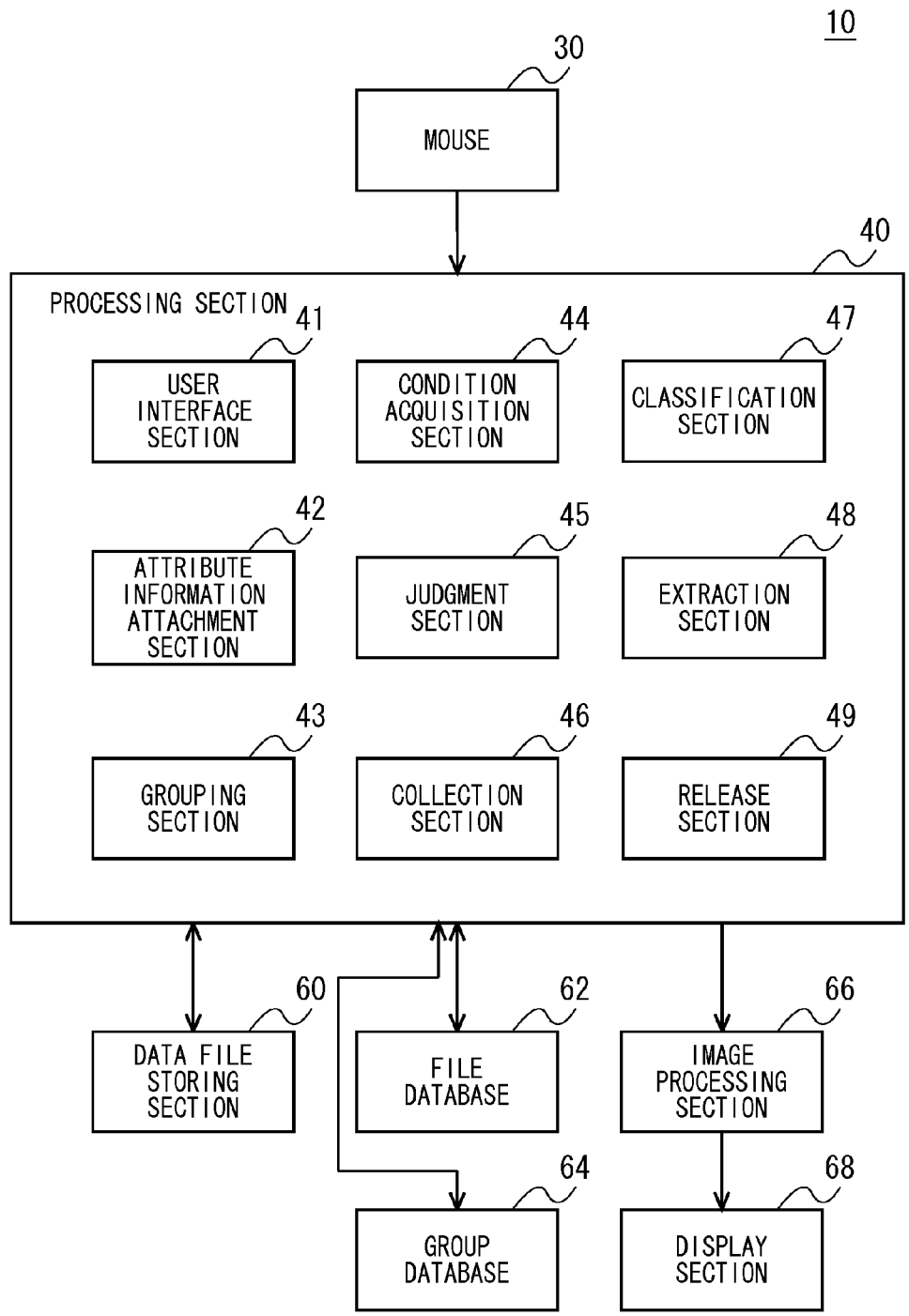
FIG. 1 is a diagram showing the configuration of a data processing apparatus according to an embodiment.

FIG. 1 shows the configuration of a data processing apparatus according to the embodiment. The data processing apparatus 10 includes a mouse 30, a processing section 40, a data file storing section 60, a file database 62, a group database 64, an image processing section 66, and a display section 68. The mouse 30 is an example of a pointing device. In terms of hardware components, this configuration can be practiced by a CPU of an arbitrary computer, a memory, a program loaded on the memory, etc. What are shown here are functional blocks to be achieved by the cooperation of these components. It is therefore understood by those skilled in the art that these functional blocks may be practiced in various forms such as by hardware alone, by software alone, and by a combination of these.

The processing section 40 accepts user's operating instructions which are input from the mouse 30, and performs processing on data files stored in the data file storing section 60. Operations to be input from the mouse 30 include pointer movements, and clicks, drags, and drops on various types of buttons. The image processing section 66 displays a user interface screen created by the processing section 40 on the display section 68.

The data file storing section 60 contains various data files such as still images, moving images, sound, and documents. The data file storing section 60 may be practiced by a storage device such as a hard disk drive (HDD), ROM, and RAM, or a removable storage medium such as CD, DVD, and MD. Attribute information on the data files is attached to the respective data files. The attribute information on a data file may include the name, path, type, data size, creator, creation date and time, update date and time, and access date and time of the data file. It may otherwise be information pertaining to the contents of the data file, such as parameters that are determined by scoring and digitizing the contents of the data file in various aspects. If the data file is a document file, the attribute information may include the number of characters, the number of pages, keywords, characteristic words, and related documents. If the data file is a music file, the attribute information may include composer, lyric writer, arranger, player, conductor, key, genre, and play time. If the data file is a web page, the attribute information may include the number of outgoing links, the number of incoming links, and the number of page views. The attribute information on data files may be registered in a database for centralized management, or attached to the respective data files. In the present embodiment, the attribute information on the data files is stored in the file database 62. The group database 64 contains information on groups of a plurality of data files.

FIG. 2 shows an example of internal data in the file database 62. The file database 62 has a file ID field 70, a filename field 71, a path field 72, a creation date and time field 73, an update date and time field 74, a size field 75, and a plurality of attribute information fields 76 to 81. The file ID field 70 contains IDs for identifying data files. The filename field 71 contains the names of the data files. The path field 72 contains the paths of the data files in the data file storing section 60. The creation date and time field 73 contains the dates and times when the data files are created. The update date and time field 74 contains the dates and times when the data files are last updated. The size field 75 contains the data sizes of the data files.

The attribute information fields 76 to 81 contain attribute information pertaining to the contents of the data files. In the example of FIG. 2, the file contents are digitized with such indexes as "exciting," "relaxing," "refreshing," "serious," "light," and "intellectual," and the resulting parameters are stored into the respective attribute information fields. For example, if the contents of a data file are an exciting action film, the "exciting" field has a high value. If the contents of a data file are environmental music such as the sound of waves, the "relaxing" field has a high value. As will be described later, the attribute data attached to the data files determines actions to be taken when the user makes an operation on the data files.

FIG. 3 shows an example of internal data in the group database 64. The group database 64 has a group ID field 82, a group name field 83, a path field 84, file ID field 85, and a plurality of attribute information fields 86 to 91. The group ID field 82 contains IDs for identifying groups. The group name field 83 contains the names of the groups. The path field 84 contains the path of a folder in the data file storing section 60 if there is any group corresponding to the folder, i.e., if all the data files included in the group are stored in the same folder. The file ID fields 85 contain the IDs of the data files included in the groups. The attribute information fields 86 to 91 are intended to contain the same attribute information as stored in the attribute information fields 76 to 81 of the file database 62. As will be described later, the groups are also given pieces of attribute information which are stored in the attribute information fields 86 to 91, respectively.

The processing section 40 includes a user interface section 41, an attribute information attachment section 42, a grouping section 43, a condition acquisition section 44, a judgment section 45, a collection section 46, a classification section 47, an extraction section 48, and a release section 49. The user interface section 41 assigns first objects to respective data units and displays them on the screen of the display section 68, the data units each being a data file or a group of a plurality of data files. The user interface section 41 also accepts an operation on the data files or groups through an operation on the first objects from the mouse 30.

Figure 4:
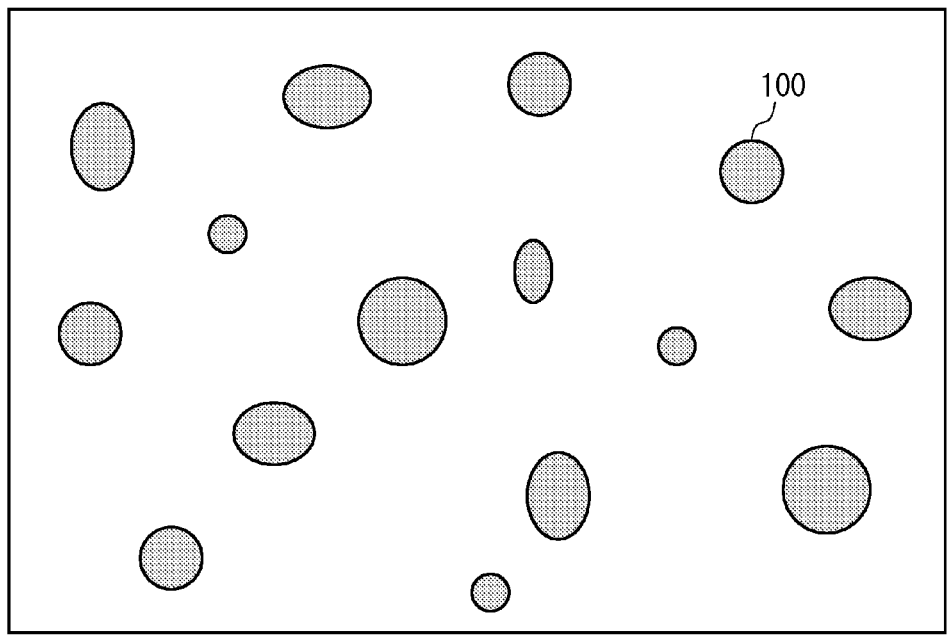
FIG. 4 is a diagram showing an example of a screen which is displayed by a user interface section.

FIG. 4 shows an example of the screen displayed by the user interface section 41. In the example of FIG. 4, geometric shapes such as circles and ellipses are displayed as first objects 100. These circles or ellipses may be rendered as metaballs. Known techniques may be used for metaball rendering. Since data files and groups of a plurality of data files are expressed by the same objects, the user can handle the data files and the groups likewise by the same operations. This makes it possible to provide an easy-to-understand, easy-to-operate user interface.

The user interface section 41 may change the mode of display of the first objects 100 according to the attribute information attached to the data files or groups. For example, the color shading inside the first objects 100 may be determined according to the values of user-specified attribute information. If the attribute information specified for determining the mode of display of the first objects 100 is "exciting," then the user interface section 41 may color the interiors of the first objects 100 more highly as they have higher values in the "exciting" field 76 of the file database 62 or the "exciting" field 86 of the group database 64.

The user interface section 41 may change the display locations of the first objects 100 according to the attribute information attached to the data files or groups. For example, the display locations of the first objects 100 may be shifted according to the values of user-specified attribute information. If the attribute information specified for determining the display locations of the first objects 100 is "exciting," then the user interface section 41 may shift first objects 100 toward the screen center as they have higher values in the "exciting" field 76 of the file database 62 or the "exciting" field 86 of the group database 64. The user interface section 41 may also shift first objects 100 toward screen edges as they have lower values.

The attribute information attachment section 42, when storing a new data file that has no attribute information into the data file storing section 60, attaches attribute information to the data file and registers it to the file database 62. The attribute information attachment section 42 may analyze the contents of the data file and determine the values to be stored in the respective attribute information fields 76 to 81. It may otherwise accept the values to be stored into the attribute information fields 76 to 81 from the user.

Figure 5:
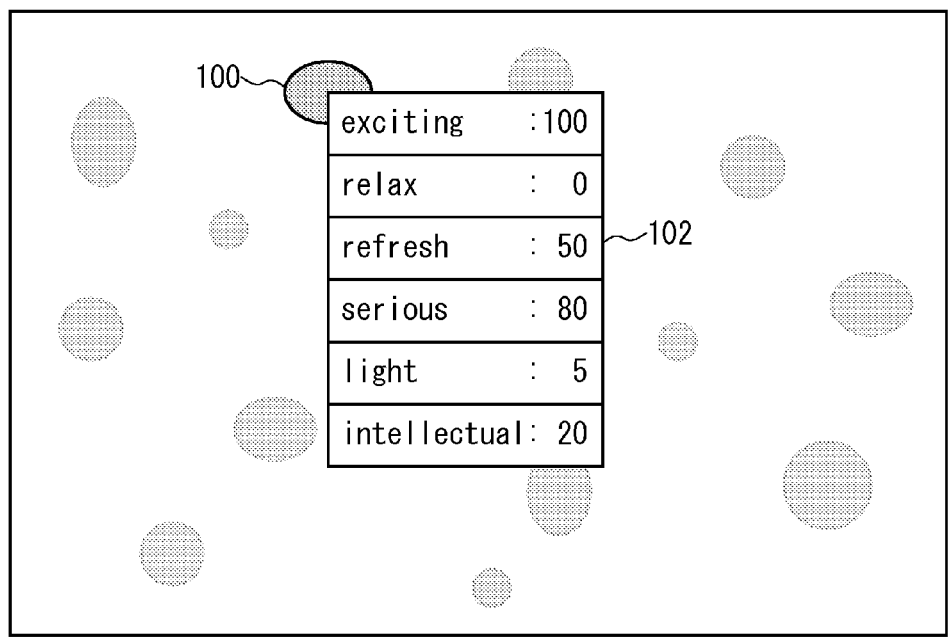
FIG. 5 is a diagram showing an example of a screen on which a list of attribute information on a data file or a group is displayed.

FIG. 5 shows an example of a screen on which a list of attribute information on a data file or group is displayed. The attribute information attachment section 42 reads the attribute information on the data file or group corresponding to a first object 100 from the file database 62 or the group database 64, and displays it in a list view when the mouse 30 is right-clicked on the first object 100. The attribute information attachment section 42 may accept user modifications to the attribute information from this list view screen 102.

(Data Merge)

The grouping section 43 accepts an operation for instructing to group a plurality of data units from the user via the mouse 30. The grouping section 43 then groups the data units together, determines attribute information on the group, and attaches it to the group based on the attribute information attached to the individual data units. For the attribute information on a group, the grouping section 43 may determine a total sum, average, maximum value, minimum value, intermediate value, or the like of the attribute information on the data files or groups to be grouped. The grouping section 43 may determine weighted averages according to such factors as the amounts of data in each of the respective data units to be grouped, the order in which the data units are added, and the values of the attribute information. For example, higher weighting may be given to data units that have greater amounts of data. Higher weighting may also be given to older data units within the group. Higher weighting may also be given to data units that have attribute information of higher values. As will be described later, the method for calculating the attribute information on a group may be changed according to the contents of the user operation. The grouping section 43 may accept the attribute information on the group from the user.

Figure 6:
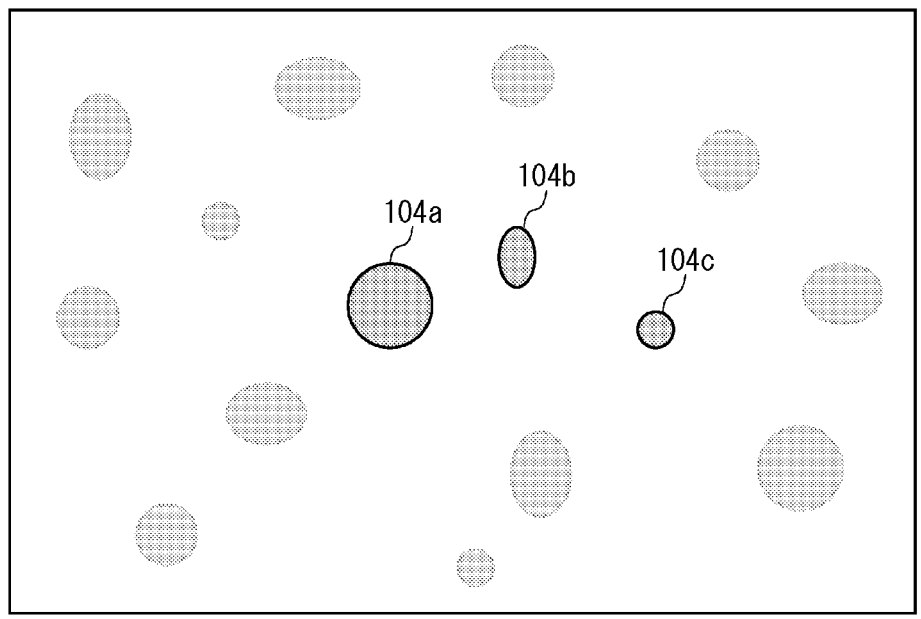
FIG. 6 is a diagram showing an example of a screen for accepting to group a plurality of data units.

FIG. 6 shows an example of a screen for accepting to group a plurality of data units. When the user selects a plurality of first objects 104a, 104b, and 104c with the mouse 30 and performs an operation for instructing to group from the menu or the like, the grouping section 43 groups the data units corresponding to the first objects 104a, 104b, and 104c selected. If the data units to be grouped include at least one existing group, the grouping section 43 adds the other data files to that group. Suppose, for example, that the data unit corresponding to the first object 104a is a group. The grouping section 43 then registers the IDs of the data files corresponding to the first objects 104b and 104c into the file ID field 85 on the record of the group corresponding to the first object 104a. Here, the grouping section 43 may change the attribute information on the group according to the attribute information on the data files to be added. For example, if the attribute information on a group is determined by averaging the attribute information on the data files included in the group, the grouping section 43 recalculates averages to determine the attribute information on the group when the data files are added to the group.

If the data units to be grouped do not include any group, i.e., all the data units are single data files, then the grouping section 43 creates a new group consisting of those data files, and registers it into the group database 64. At this point, the grouping section 43 calculates the attribute information on the group from the attribute information on the data files included in the group, and registers the IDs of the data files included in the group and the attribute information attached to the group into the group database 64 in association with each other.

Figure 7:
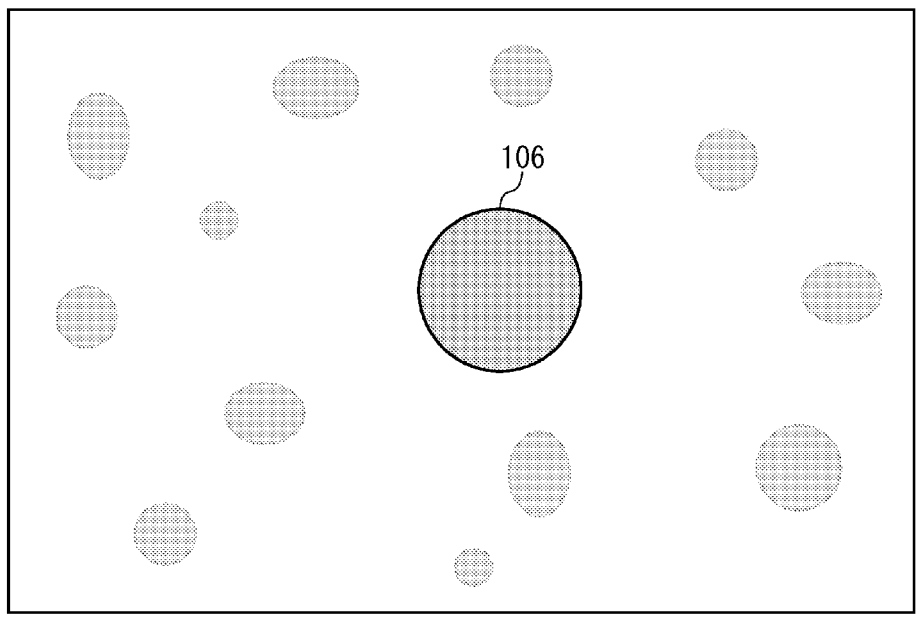
FIG. 7 is a diagram showing an example of a screen on which a plurality of data units are grouped.

FIG. 7 shows an example of a screen on which the plurality of data units are grouped. Instead of the first objects 104a, 104b, and 104c corresponding to the data units to be grouped, a first object 106 corresponding to the grouped data units appears on-screen. The first objects 104a, 104b, and 104c corresponding to the data units that are included in the data unit corresponding to the first object 106 may be displayed inside the first object 106. The first object 106 may be modified in shape, size, color, or other factors according to the number of data units included in the group, the amounts of data, the types of data, the attribute information, etc.

Using such techniques, a plurality of data units can be grouped together by simple operations. Moreover, it is possible not only to group data files with each other, but also to handle data files and groups, or two or more groups, as grouped together. It is also possible to group data files regardless of the locations where the data files are stored in the data file storing section 60. Furthermore, attribute information can be automatically attached to groups for management purpose. This can further improve user convenience.

Figure 8:
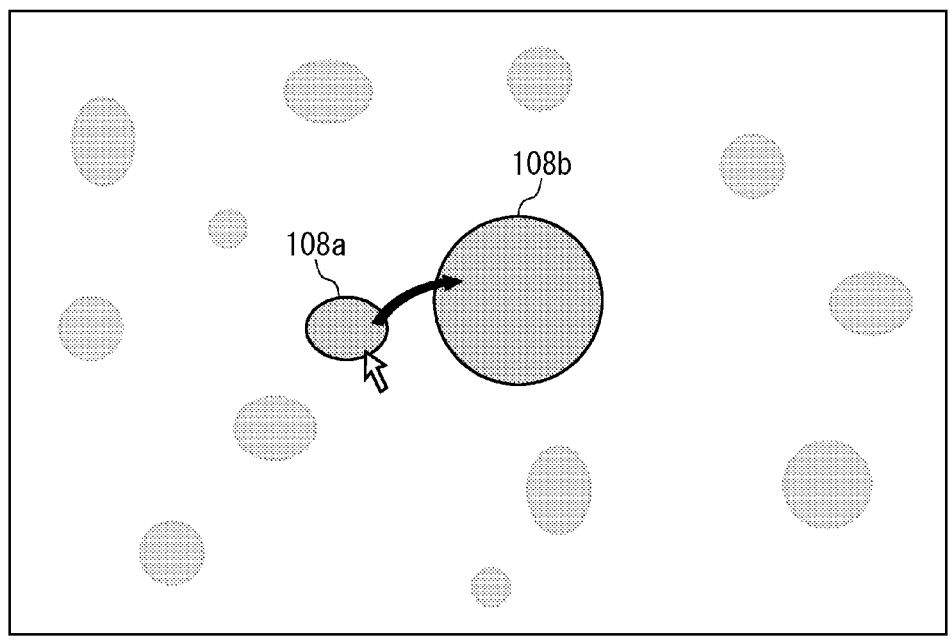
FIG. 8 is a diagram showing another example of the screen for accepting to group a plurality of data units.
Figure 9:
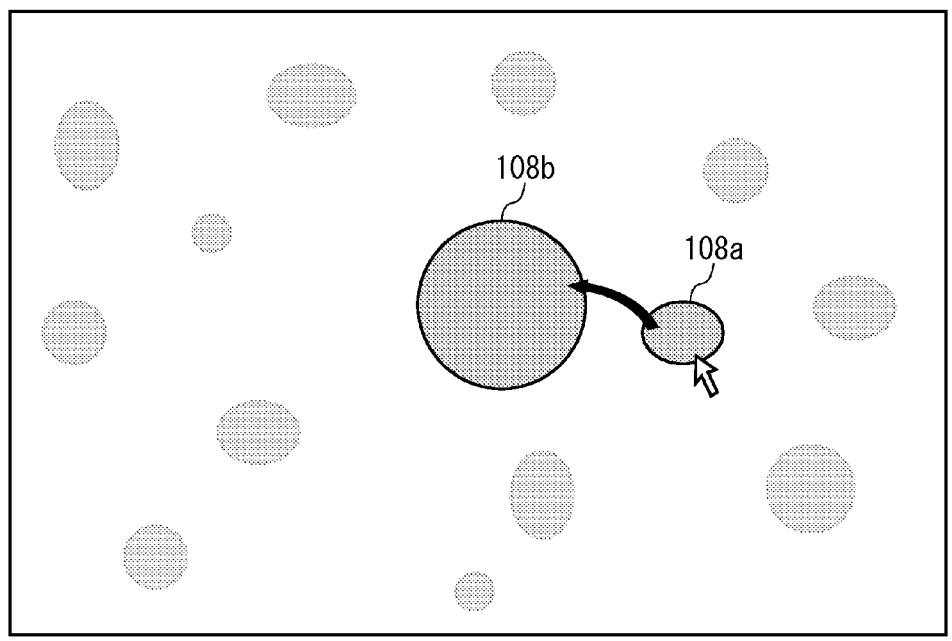
FIG. 9 is a diagram showing another example of the screen for accepting to group a plurality of data units.

FIGS. 8 and 9 show other examples of the screen for accepting to group a plurality of data units. When the user operates the mouse 30 to drag a first object 108a corresponding to a first data unit and put it into contact with or drop it on a first object 108b corresponding to a second data unit, the grouping section 43 groups these data units.

The grouping section 43 may determine the method for calculating the attribute information on the group according to the positions, directions, and/or speeds of the first objects when coming into contact with each other. For example, depending on the direction from which the first object 108a is brought into contact with the first object 108b, the grouping section 43 may determine which to give priority to, the attribute information on the first data unit corresponding to the first object 108a or the attribute information on the second data unit corresponding to the first object 108b. More specifically, as shown in FIG. 8, if the first object 108a is dragged into contact with the first object 108b from the left of the first object 108b, the grouping section 43 may give a higher weighting to the attribute information on the first data unit corresponding to the first object 108a, thereby giving priority to the first data unit. As shown in FIG. 9, if the first object 108a is dragged into contact with the first object 108b from the right of the first object 108b, the grouping section 43 may give a higher weighting to the attribute information on the second data unit corresponding to the first object 108b, thereby giving priority to the second data unit. The weighting may be determined according to the speed at which the first object 108a is brought into contact with the first object 108b.

As will be described later, when the first object 108a is dragged near to the first object 108b, the first object 108b may be deformed depending on the similarity between the attribute information on the first data unit corresponding to the first object 108*a* and the attribute information on the second data unit corresponding to the first object 108*b*. For example, when the data units are similar to each other, the first objects are deformed as if attracting each other. When the data units are not similar to each other, the first objects are deformed as if repelling each other. Consequently, it is possible to search for data units similar to a certain data unit or to determine whether or not data units to be grouped are similar to each other. This can improve user convenience.

Figure 10:
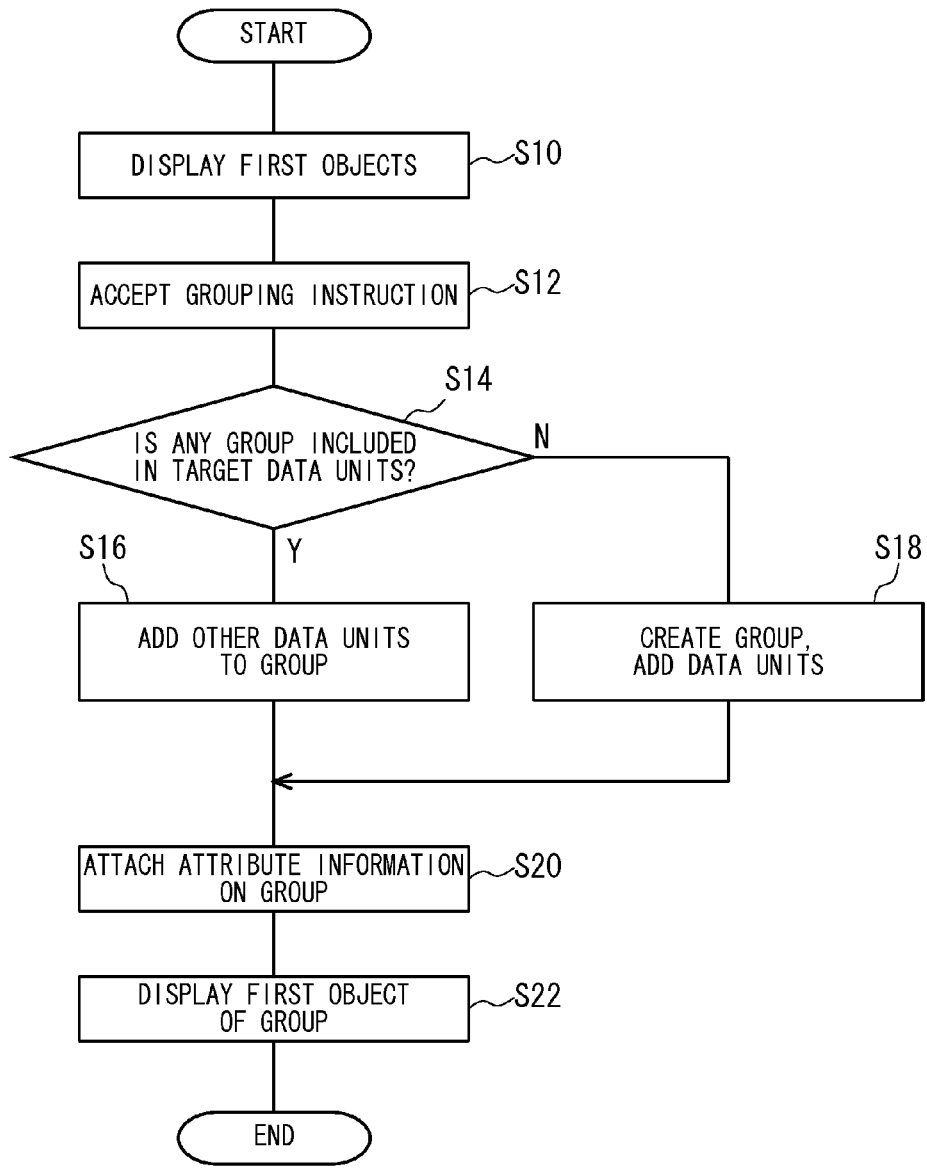
FIG. 10 is a flowchart showing steps of a data processing method according to the embodiment.

FIG. 10 is a flowchart showing the steps of a data processing method according to the embodiment. In FIG. 10, the steps for grouping data will be described. Initially, the user interface section 41 consults the file database 62 and the group database 64, and displays on-screen the first objects corresponding to data files or groups of a plurality of data files stored in the data file storing section 60 (S10). The user interface section 41 accepts an instruction to group a plurality of data units (S12). If the data units to be grouped include any group (Y at S14), the grouping section 43 adds the other data units to that group (S16). If not (N at S14), it creates a new group and adds the data units to be grouped to that group (S18). The grouping section 43 may create a group that includes one or more groups of a plurality of data files. That is, groups may be nested.

The grouping section 43 determines attribute information on the group and attaches it to the group based on the attribute information on the data units to be grouped (S20). The user interface section 41 displays a first object corresponding to the group on-screen (S22). At this point, the first objects corresponding to the data units to be grouped may be erased from the screen. The mode of display of the first object corresponding to the group may be determined according to such factors as the attribute information on the group and the amounts of data in the data units included in the group.

(Data Determination)

The condition acquisition section 44 acquires conditions on the attribute information attached to the data files or groups. The judgment section 45 displays on-screen a second object, which is assigned to the function of searching for data units that conform to the conditions acquired by the condition acquisition section 44. The judgment section 45 moves the second object within the screen according to user instructions, and judges if attribute information on data units corresponding to first objects displayed in the vicinity of the second object conforms to or is similar to the conditions. That is, the second object functions as a probe for searching for data units that have attribute information conforming to or similar to the conditions.

Figure 11:
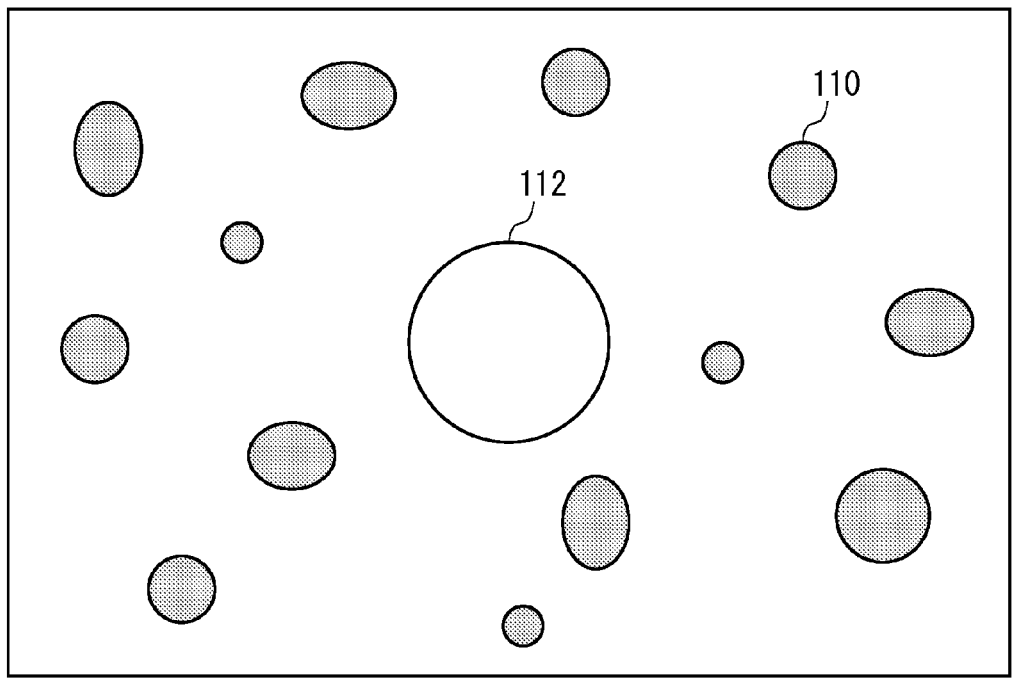
FIG. 11 is a diagram showing an example of a screen on which a second object is displayed.

FIG. 11 shows an example of a screen on which a second object is displayed. In the example of FIG. 11, a circle somewhat larger than the circles and ellipses of the first objects 110 is displayed as a second object 112. The second object 112 may be rendered as a metaball as with the first objects 110.

Figure 12:
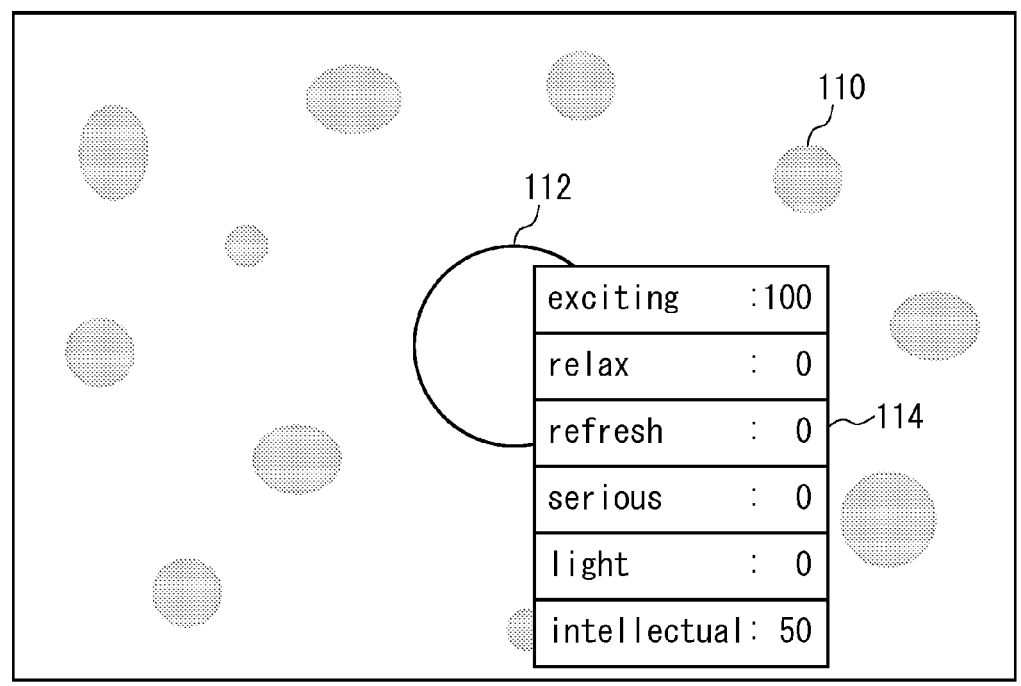
FIG. 12 is a diagram showing an example of a screen on which conditions on attribute information given to the second object are displayed.

FIG. 12 shows an example of a screen on which conditions on the attribute information imposed on the second object are displayed. The condition acquisition section 44 displays the conditions on the attribute information to be imposed on the second object 112 in a list view when the mouse 30 is right-clicked on the second object 112, for example. The attribute information attachment section 42 accepts user specifications for the conditions on the attribute information from this list view screen 114.

Figure 13:
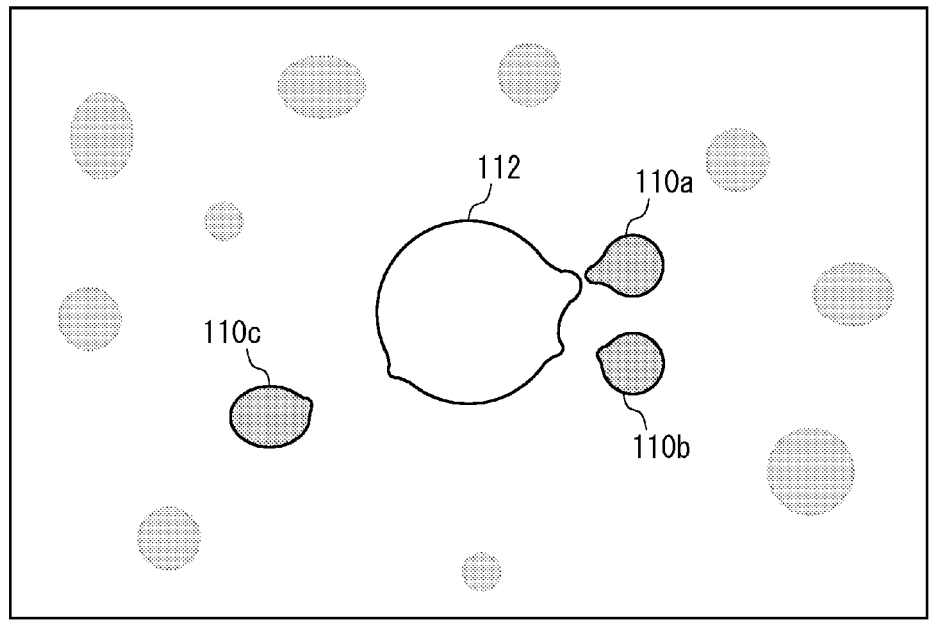
FIG. 13 is a diagram showing an example of a screen to appear when the second object is brought close to first objects.
Figure 14:
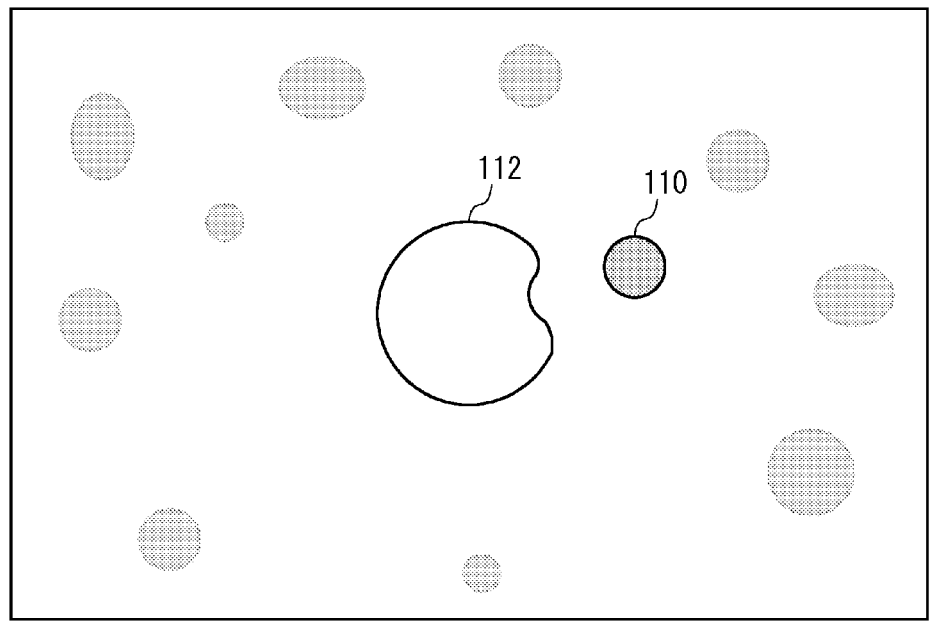
FIG. 14 is a diagram showing an example of a screen to appear when the second object is brought close to a first object.

FIGS. 13 and 14 show examples of a screen to appear when the second object is brought close to first objects. The judgment section 45 judges if the attribute information on the first objects 110 conforms to or is similar to the conditions imposed on the second object 112. If the attribute information on the data units corresponding to first objects 110 displayed near the second object 112 conforms to or is similar to the conditions, the judgment section 45 deforms the first objects 110 and/or the second object 112 as if the first objects 110 and the second object 112 attract each other as shown in FIG. 13. If the attribute information on the data units corresponding to first objects 110 displayed near the second object 112 does not conform to or is not similar to the conditions, the judgment section 45 deforms the first objects 110 and/or the second object 112 as if the first objects 110 and the second object 112 repel each other as shown in FIG. 14.

The judgment section 45 may judge the degrees of conformity to the conditions of the data units corresponding to first objects 110 that fall within a predetermined distance from the second object 112, and deform the first objects 110 and/or the second object 112. The degrees of conformity to the conditions may be determined, for example, by calculating Euclidean distances or Manhattan distances of nth order between n pieces of attribute information set as the conditions and n pieces of attribute information on the data units corresponding to the respective first objects 110. Here, the smaller the calculated distances are, the higher the degrees of conformity or similarity may be determined to be. If the conditions are set on certain pieces of attribute information alone, a distance or inner product may be calculated with regard to only the conditioned pieces of attribute information. In this case, other attribute information similar to the conditioned pieces of attribute information may be taken into account. For example, given a condition that "refreshing"="80," data units having high values in "relaxing," which is similar to "refreshing," may be judged as being similar to the condition.

The judgment section 45 may determine the amounts of deformation of the first objects 110 and/or the second object 112 according to the distances between the first objects 110 and the second object 112. For example, first objects 110 closer to the second object 112 may be given greater amounts of deformation. The farther the first objects 110 are from the second object 112, the smaller the amounts of deformation may be. In FIG. 13, the first object 110*a* is closer to the second object 112 than the first object 110*c* is, and thus is deformed by a greater amount. This makes it possible to show more clearly if the data units corresponding to first objects 110 around the user-operated second object 112 conform to or are similar to the conditions.

The judgment section 45 may determine the amounts of deformation of the first objects 110 and the second object 112 according to the degrees of conformity or similarity to the conditions of the attribute information on the data units corresponding to the first objects 110. For example, the higher the degree of conformity or similarity to the conditions is, the greater the amount of deformation may be made. The lower the degree of conformity or similarity to the conditions is, the smaller the amount of deformation may be made. In FIG. 13, the attribute information on the data unit corresponding to the object 110*a* has a higher degree of conformity or similarity to the conditions than the attribute information on the data unit corresponding to the first object 110*b* does. The first object 110*a* is thus deformed as if being attracted to the second object 112 by a greater amount. This makes it possible to show the degrees of conformity or similarity to the conditions in a way that is easy to understand visually.

The judgment section 45 may define an attractive force or repulsive force with such variables as the attribute information on the data unit corresponding to a first object 110, the conditional attribute information given to the second object 112, and a distance between the first object 110 and the second object 112. Then, the judgment section 45 may determine the amounts of deformation of the first object 110 and the second object 112 depending on the attractive force or repulsive force. For example, the judgment section 45 may calculate a force that is proportional to a value determined by subtracting a predetermined constant from a difference between pieces of attribute information on the two, and inversely proportional to the square of the distance between the objects. The force calculated is then applied to the first object 110 and the second object 112 to deform the first object 110 and the second object 112 through physical calculations.

Figure 15:
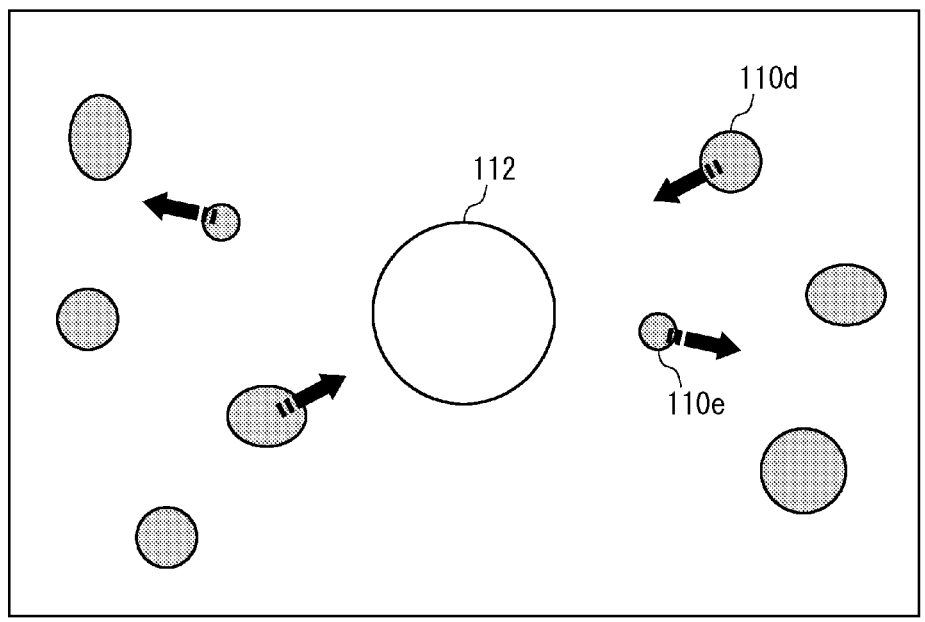
FIG. 15 is a diagram showing how objects are moved by forces acting between the objects.

The judgment section 45 may move the first objects 110 or the second object 112 according to the attractive forces or repulsive forces calculated. FIG. 15 shows how objects are moved by forces acting between the objects. A first object 110d corresponding to a data unit that has attribute information conforming to or similar to given conditions approaches the second object 112 as if being attracted. A first object 110e corresponding to a data unit that has attribute information not conforming nor similar to the conditions moves away from the second object 112 as if being repelled. Consequently, it is possible to automatically collect first objects 110 corresponding to data units conforming to or similar to the conditions around the second object 112, with an improvement to user convenience.

The judgment section 45 may also judge similarities between the pieces of attribute information on data units and deform the first objects depending on the similarities as described above even when grouping the data units. Suppose, for example, that the first object 108a is dragged near to the first object 108b as shown in FIG. 8 or 9. If the data units corresponding to these first objects have similar attribute information, the judgment section 45 deforms the first object 108a and the first object 108b as if attracting each other, in the same way as is shown in FIG. 13. If not similar, the judgment section 45 deforms the first object 108a and the first object 108b as if repelling each other, in the same way as is shown in FIG. 14. This makes it possible to visually determine similarities between data units even when grouping the data units or when moving the data units to other folders. For example, it is therefore possible to group data units of high similarity together or move data units to folders of high similarity.

Instead of the second object 112, the pointer of the mouse 30 may be provided with the conditional attribute information. In this case, the pointer of the mouse 30 functions as a probe for searching for data units that have attribute information conforming to or similar to the conditions.

(Data Collection)

The collection section 46 collects data units conforming to or similar to conditions imposed on the second object. The second object functions as a container for collecting data units that have attribute information conforming to or similar to the conditions.

Figure 16:
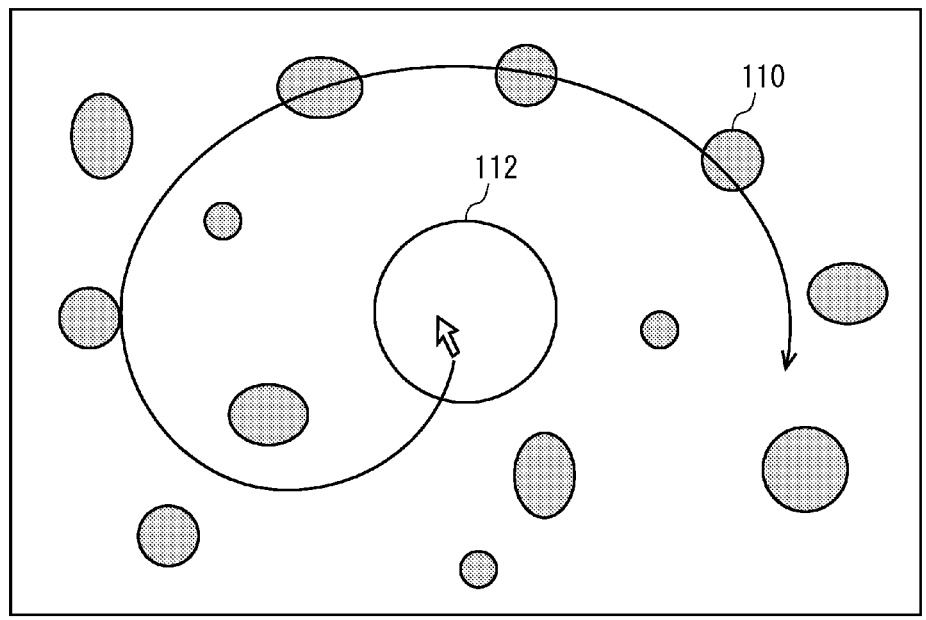
FIG. 16 is a diagram showing a screen which displays how data units are collected by using the second object.

FIG. 16 shows a screen which displays how data units are collected using the second object. When the user drags the second object 112 to scan the screen on which first objects 110 are scattered, the collection section 46 adds data units conforming to or similar to the conditions imposed on the second object 112 to a group corresponding to the second object 112. This allows the user to collect desired data units with an operational sensation that resembles moving a magnet in iron sand to draw out and collect iron particles from it.

The collection section 46 may collect data units conforming to or similar to the conditions when the distances between the second object 112 and the first objects 110 corresponding to the data units fall below a predetermined threshold. For example, when the user moves the second object 112, the collection section 46 reads attribute information corresponding to a data unit corresponding to a first object 110 that overlaps the second object 112, and determines its similarity to the conditions. If the similarity is higher than a predetermined threshold, the collection section 46 adds the data unit to the group corresponding to the second object 112.

The collection section 46 may define an attractive force or repulsive force with such variables as attribute information on the data unit corresponding to a first object 110, attribute information that is set as the conditions, and a distance between the first object 110 and the second object 112. Then, the collection section 46 may collect the data unit when the attractive force exceeds a predetermined threshold. The attractive force may be defined so that it is proportional to the similarity between the attribute information on the data unit corresponding to the first object 110 and the attribute information set as the conditions, and is inversely proportional to the distance or the square of the distance between the first object 110 and the second object 112. The collection section 46 may move the first object 110 according to the attractive force or repulsive force.

The collection section 46 may change the threshold according to the moving speed of the second object 112. For example, if the second object 112 is moving at high speed, the threshold may be raised so that first objects 110 having attribute information of higher similarity are collected. If the second object 112 is moving at low speed, the threshold is lowered so that first objects 110 having attribute information of lower similarity are also collected. This makes it possible to provide an easy-to-understand, easy-to-operate user interface.

Figure 17:
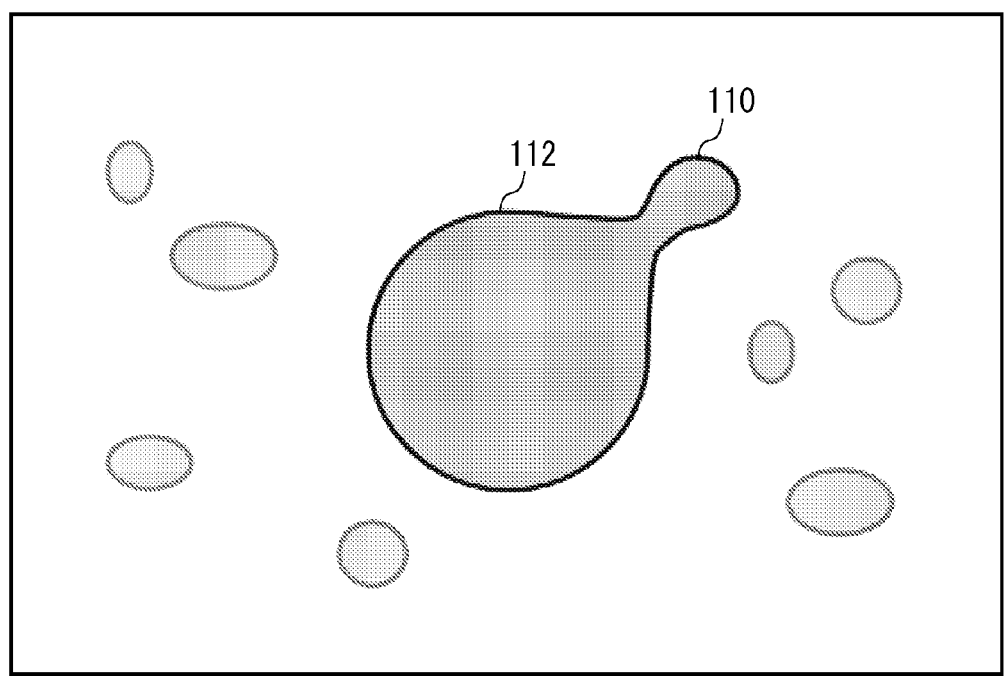
FIG. 17 is a diagram showing a screen which displays how a first object merges into the second object.

When collecting data units, the collection section 46 may display how first objects 110 corresponding to the data units are taken into or merged into the second object 112. FIG. 17 shows a screen which displays how a first object 110 is merged into the second object 112. When the first object 110 and the second object 112 are merged, the first object 110 may be erased. This can express in a way that is easy to visually understand that the data unit corresponding to the first object is taken into a group of collected data units, corresponding to the second object.

Figure 18A:
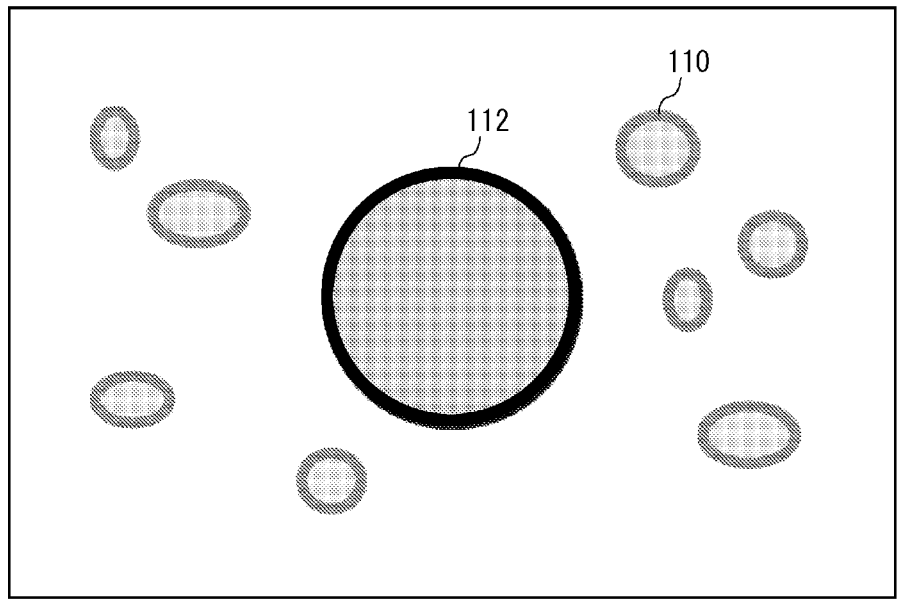
FIGS. 18A and 18B are diagrams showing examples of a screen on which the second object is changed in color according to the number of data units collected.
Figure 18B:
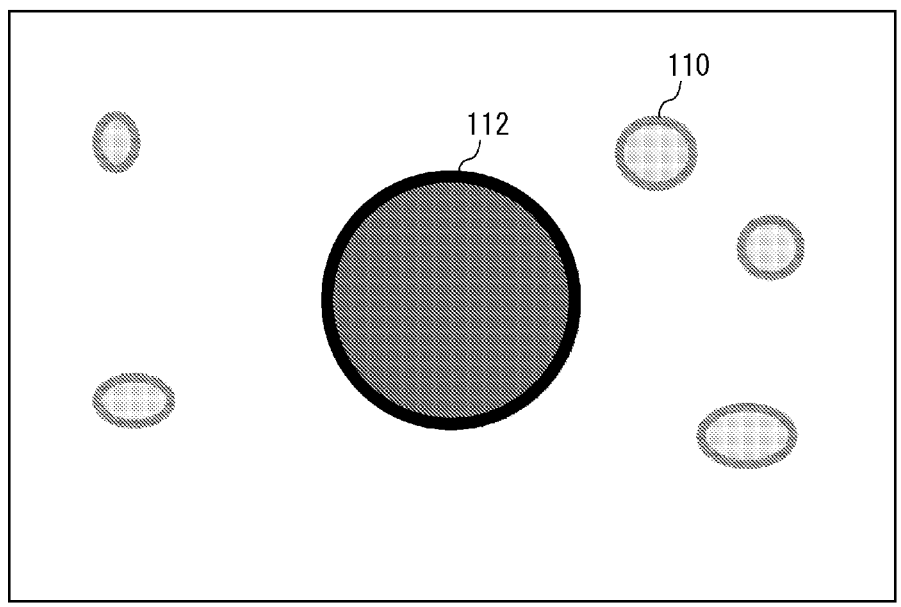
Figure 19A:
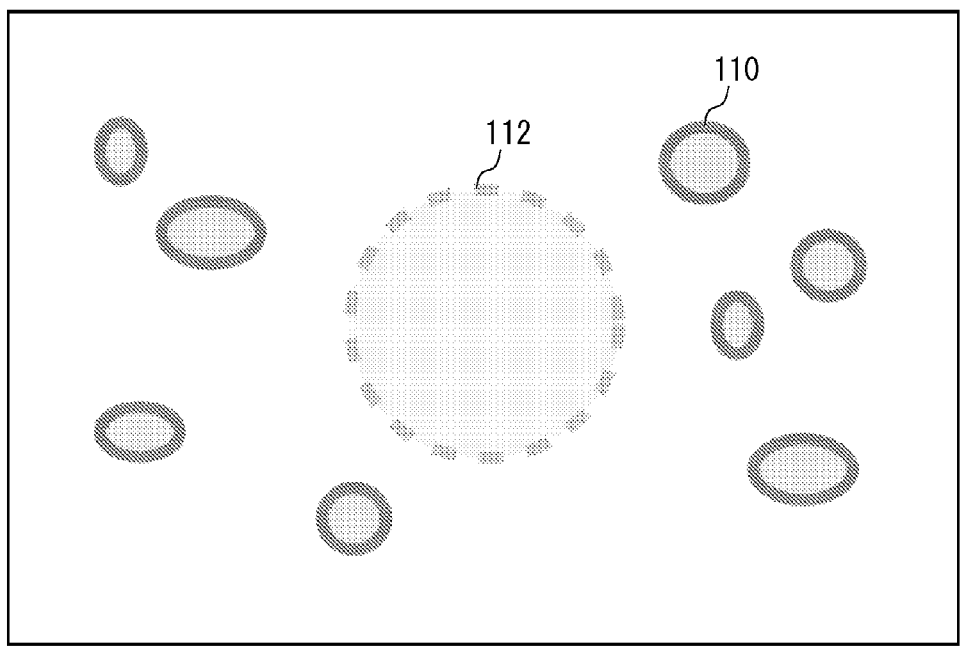
FIGS. 19A and 19B are diagrams showing examples of a screen on which the second object is changed in transparency according to the number of data units collected.
Figure 19B:
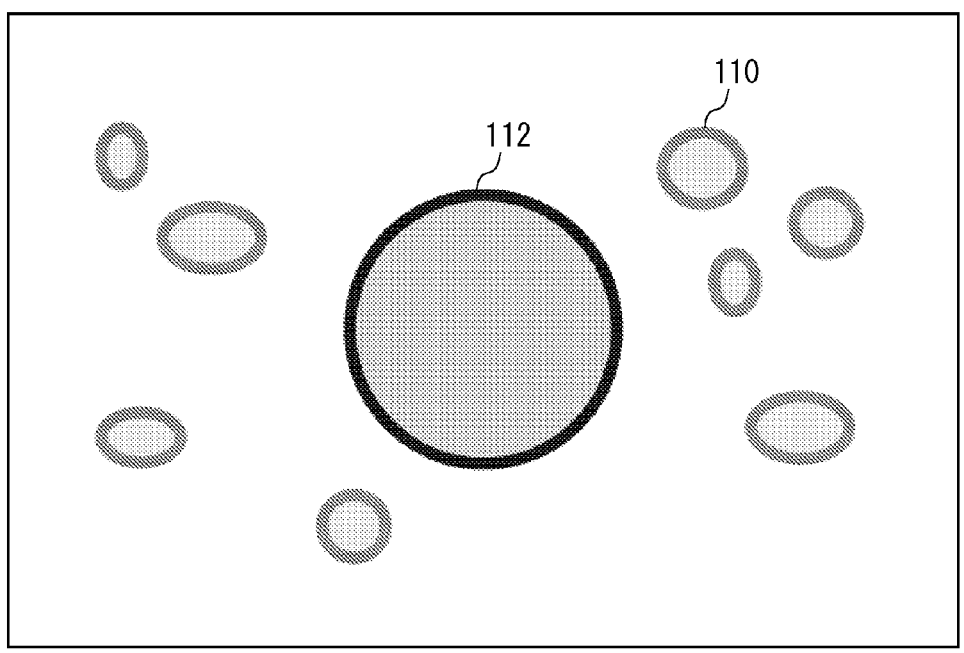
Figure 20A:
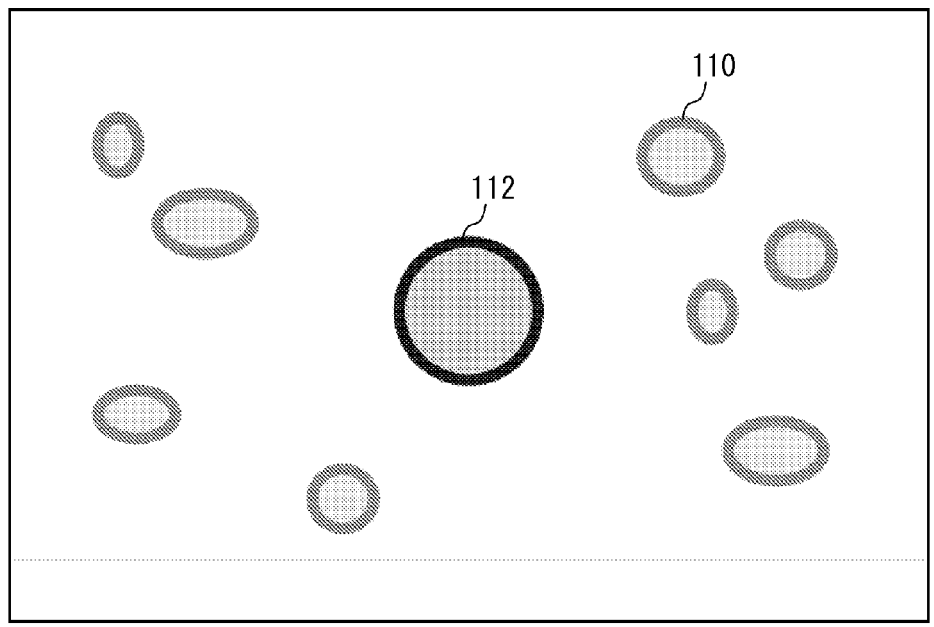
FIGS. 20A and 20B are diagrams showing examples of a screen on which the second object is changed in transparency according to the number of data units collected.
Figure 20B:
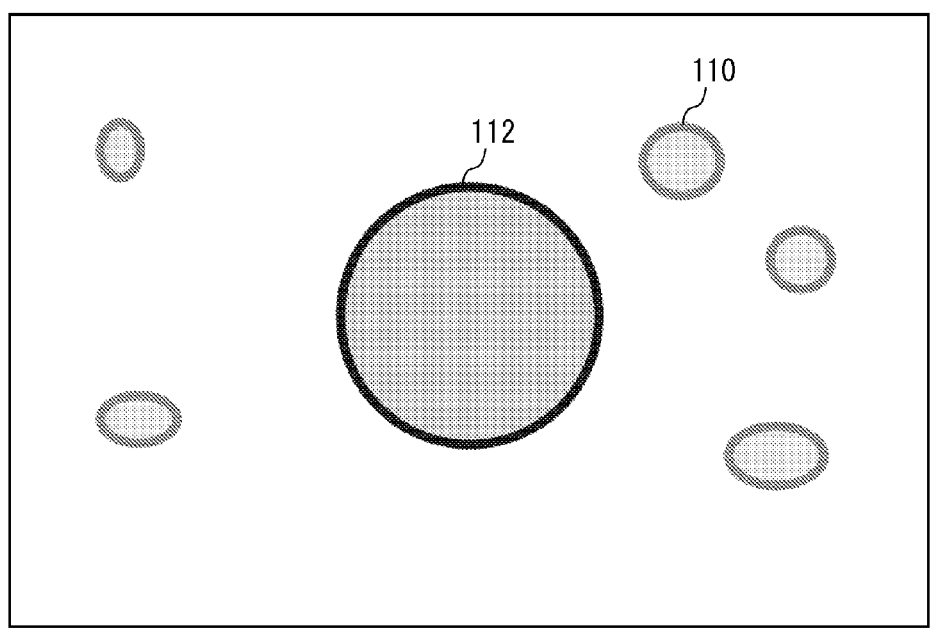
Figure 21A:
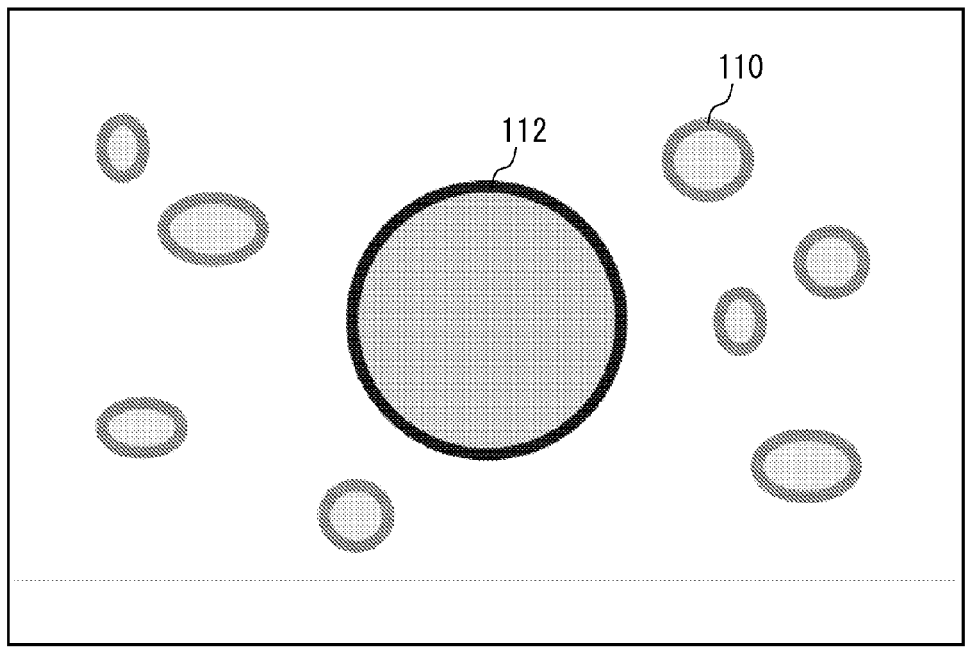
FIGS. 21A and 21B are diagrams showing examples of a screen on which the second object is changed in shape according to the number of data units collected.
Figure 21B:
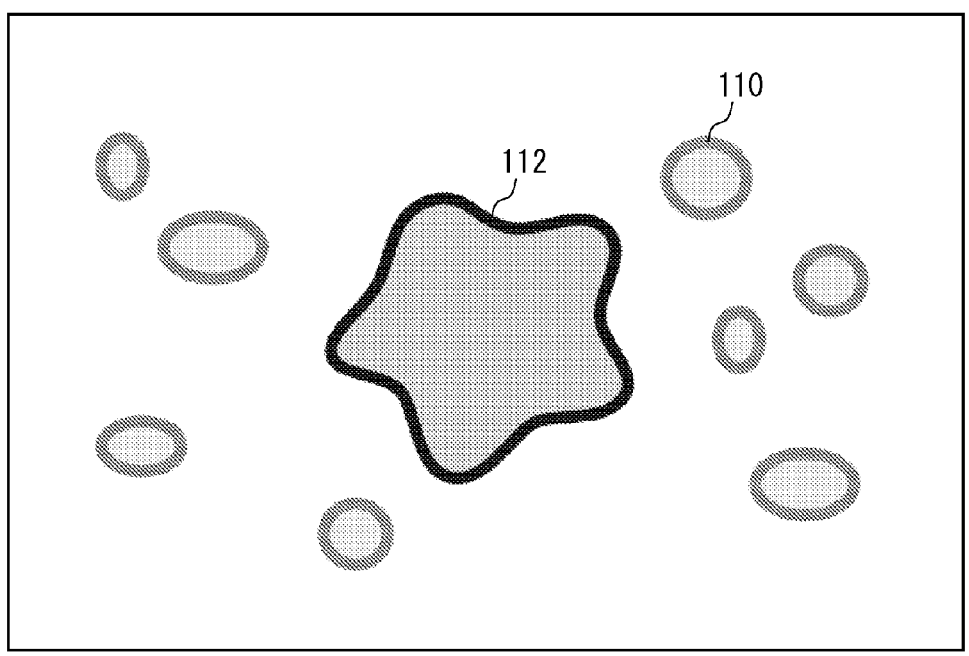

The collection section 46 may determine the mode of display of the second object 112 according to the number of data units collected. For example, the collection section 46 may change the second object 112 in color, transparency, size, and/or shape according to the number of data units collected. As shown in FIG. 18A, the second object 112 may be displayed in a reddish color when the number of data units is small. As shown in FIG. 18B, it may be changed to a bluish color as the number of data units increases. As shown in FIG. 19A, the second object 112 may also be given high transparency when the number of data units is small. As shown in FIG. 19B, the transparency may be lowered as the number of data units increases. As shown in FIG. 20A, the second object 112 may be given a small size when the number of data units is small. As shown in FIG. 20B, the size may be increased as the number of data units increases. The collection section 46 may change the shape of the second object 112 according to the distribution of attribute information on the data units collected. For example, as shown in FIGS. 21A and 21B, the second object 112 may be deformed into a star shape as the number of data units having high "exciting" values increases.

Figure 22A:
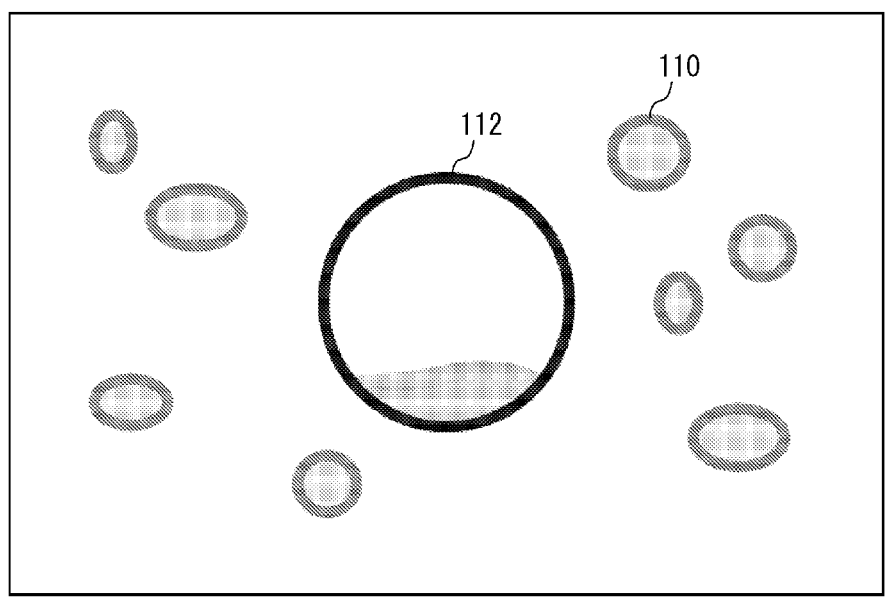
FIGS. 22A and 22B are diagrams showing examples of a screen on which the amount of liquid accumulated in the second object is changed according to the number of data units collected.
Figure 22B:
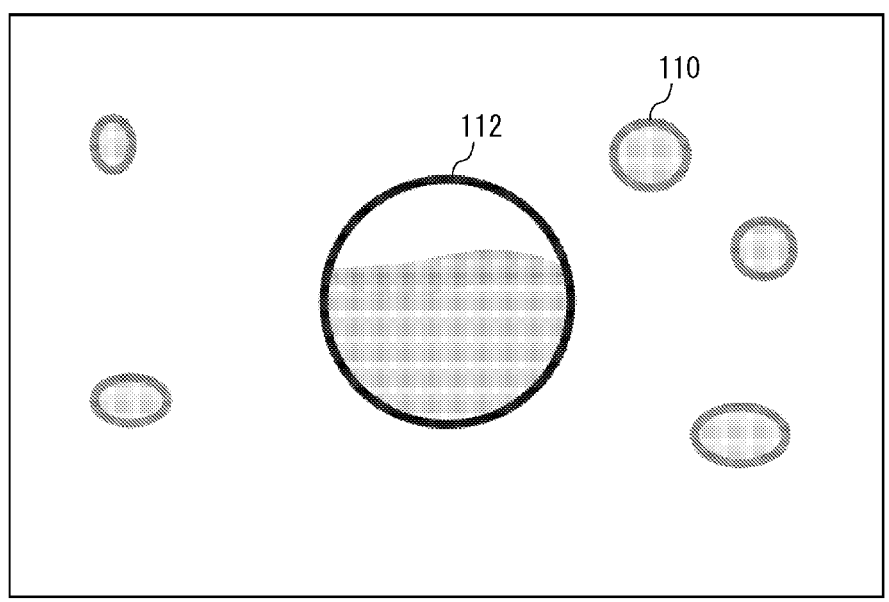
Figure 23A:
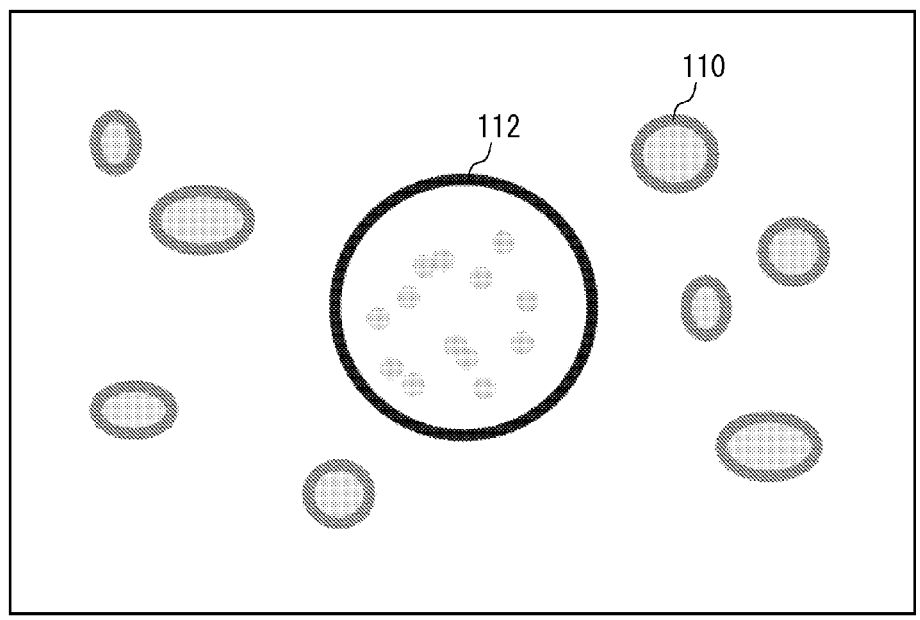
FIGS. 23A and 23B are diagrams showing examples of a screen on which the amount of bubbles accumulated in the second object is changed according to the number of data units collected.
Figure 23B:
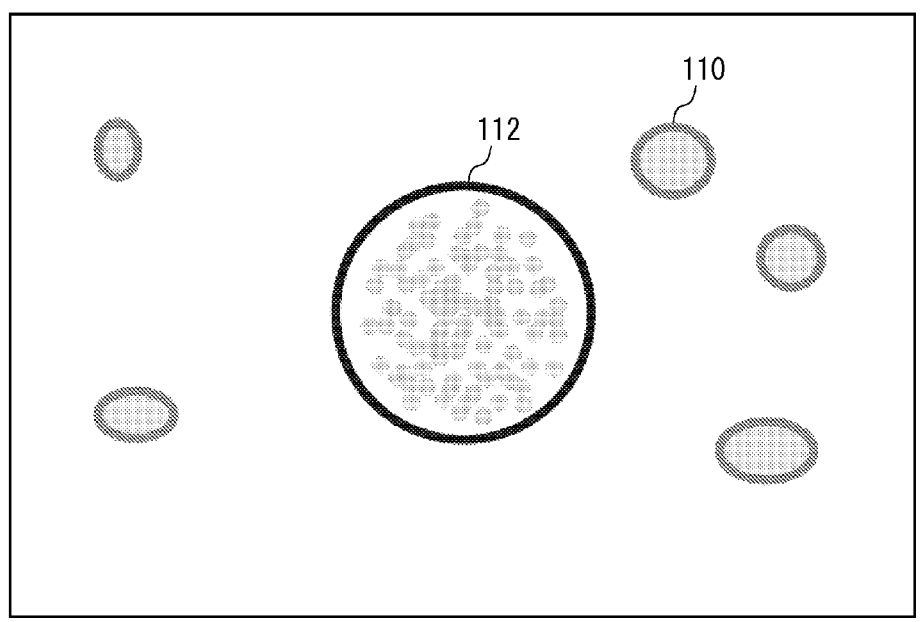
Figure 24:
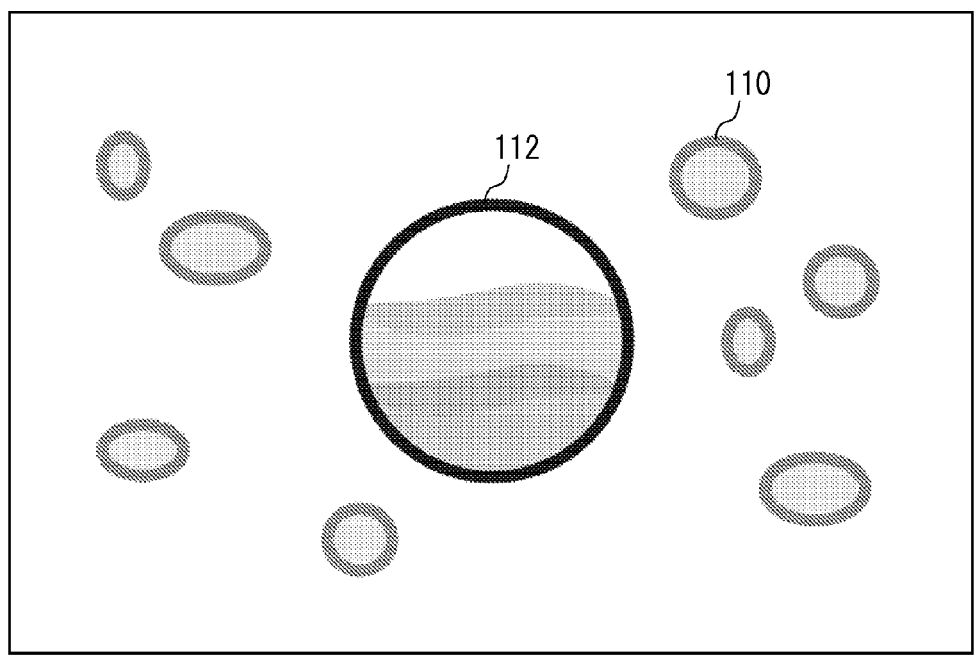
FIG. 24 is a diagram showing an example of a screen which displays how a plurality of layers of liquids are accumulated corresponding to a respective plurality of types of attribute information.

Assuming that the second object 112 is a closed surface, the number of data units collected may be expressed by displaying liquid, bubbles, or the like being accumulated inside. For example, as shown in FIGS. 22A and 22B, liquid may be accumulated in the second object 112 as the number of data units increases. As shown in FIGS. 23A and 23B, bubbles may be accumulated in the second object 112 as the number of data units increases. The liquid accumulated inside may be changed in viscosity, refractivity, or the like according to the distribution of attribute information on the data units collected. The bubbles may be changed in color, transparency, size, shape, etc. Moreover, as shown in FIG. 24, a plurality of layers of liquids corresponding to respective types of attribute information may be displayed as if being accumulated.

The collection section 46 may automatically collect data units by automatically moving the second object 112 according to predetermined rules. For example, the second object 112 may be moved to spiral outward from the center of the screen so that data units conforming to or similar to given conditions are collected from among the data units corresponding to the first objects 110 scattered on the screen. This makes it possible to collect user-desired data units automatically, and provide a unique fun-to-see user interface by displaying how the data units are collected on-screen.

Instructing operations for moving the second object 112 may be input from such input devices as cursor keys and a mouse, or through a tilt sensor or the like that is arranged in a controller for the user to grip and operate. In the latter case, the user can tilt the controller to move the second object and collect data units. This makes possible an amazing user interface of high operability.

Figure 25:
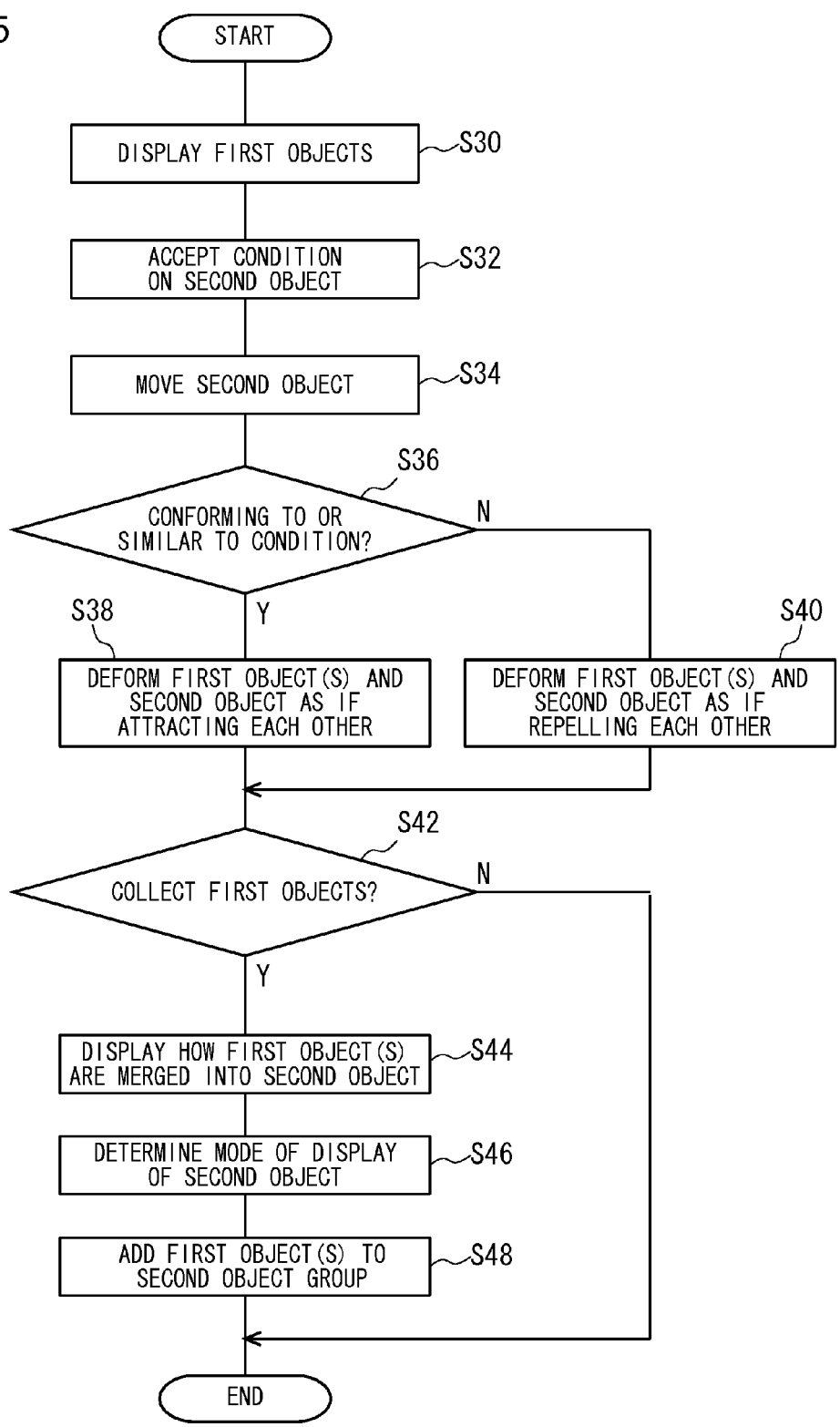
FIG. 25 is a flowchart showing steps of the data processing method according to the embodiment.

FIG. 25 is a flowchart showing steps of the data processing method according to the embodiment. With reference to FIG. 25, a description will be given of the steps for judging and collecting data. Initially, the user interface section 41 consults the file database 62 and the group database 64, and displays first objects corresponding to data files or groups of a plurality of data files stored in the data file storing section 60 on-screen (S30). The condition acquisition section 44 acquires conditions on the attribute information attached to the data files or groups, and associates the second object 112 with those conditions (S32). The judgment section 45 moves the second object 112 according to user instructions (S34). At this point, the judgment section 45 judges if the attribute information on the data unit corresponding to each first object 110 displayed on-screen conforms to or is similar to the conditions. If conforming or similar (Y at S36), the judgment section 45 deforms the first object 110 and/or the second object 112 as if the first object 110 and the second object 112 attract each other (S38). If not (N at S36), the judgment section 45 deforms the first object 110 and/or the second object 112 as if the first object 110 and the second object 112 repel each other (S40). The judgment section 45 may target the judgment on first objects 110 that are displayed within a predetermined distance from the second object 112.

If the foregoing condition for collecting first objects 110 is satisfied (Y at 42) such as when the second object 112 is brought within the predetermined threshold distance from the first objects 110, then the collection section 46 displays how the first objects 110 are merged into the second object 112 (S44). Then, the collection section 46 erases the first objects 110, determines the mode of display of the second object 112 according to such factors as the number of data units collected to the second object 112 and the attribute information thereon, and displays the second object 112 (S46).

When the user clicks on ENTER button or otherwise operates to end the collection of first objects 110, the collection section 46 adds a record on the group corresponding to the second object 112 to the group database 64, and adds the file IDs of the data files corresponding to those first objects which have been collected (S48). It also determines pieces of attribute information on the group corresponding to the second object 112 and stores them into respective attribute information fields. The second object 112 will subsequently be handled as a first object 110 that includes a plurality of data files. In situations where the second object 112 is managed separately from the first objects 110 as a special object having the collecting function, a record corresponding to the second object 112 may be created and managed separately in the group database 64. In this case, the collection section 46 may register the data files corresponding to the collected first objects 110 into the group database 64 when the first objects 110 are collected by the second object 112. Alternatively, the data files may be registered into the group database 64 at the end of the collection process, such as when the movement of the second object 112 is stopped and when the user clicks the ENTER button.

It should be appreciated that the first objects 110 may have the data collecting function. In this case, the attribute information attached to the first objects 110 may be used as the conditions for collection. When a first object 110 is moved, the collection section 46 collects other first objects having attribute information similar to that of the first object 110 and registers them into the group corresponding to the first object 110.

(Data Classification)

The classification section 47 accepts an operation for instructing to classify a plurality of data units included in a data unit, the operation being made on a first object corresponding to the data unit that includes the plurality of data units. The classification section 47 then deforms the first object according to the distribution of attribute information on the plurality of data units included in the data unit corresponding to the first object.

Figure 26:
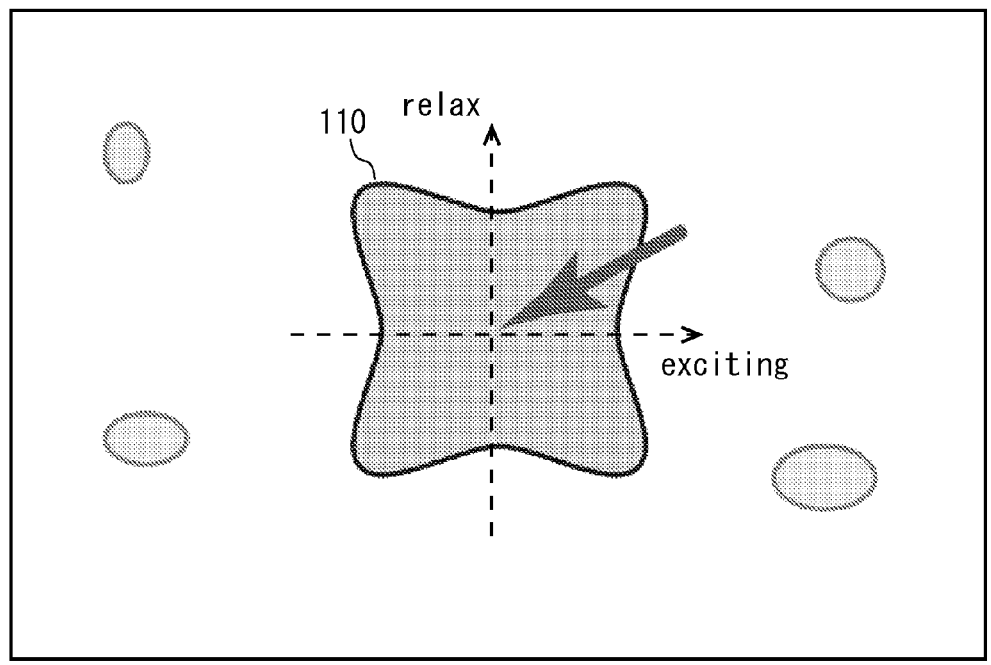
FIG. 26 is a diagram showing a screen which displays how data units are classified.

FIG. 26 shows a screen which displays how data units are classified. When the user clicks on or presses a first object 110 that corresponds to a data unit including a plurality of data units for more than a predetermined period, the classification section 47 deforms the first object 110 according to the distribution of attribute information on those data units. Here, a description will be given of the case where classification of a first object 110 that corresponds to a group or folder including a plurality of data units is instructed. The same discussion holds true, however, when classification of a second object having a plurality of data units collected is instructed.

The classification section 47 may determine the shape of the first object 100 by mapping the data units with a plurality of types of attribute information on the axes. In the example of FIG. 26, data units are mapped with two pieces of attribute information "exciting" and "relaxing" on the axes. More specifically, data units having high "exciting" values are mapped to the right, and data units having high "relaxing" values are mapped to the top. This determines the shape of the first object 110. The densities of the data units mapped may be rendered in different levels of color tone, transparency, or the like in the first object 110.

The classification section 47 may determine the amount of deformation of the first object 110 according to the strength or duration of the clicking or pressing operation. The higher the strength with which the first object 110 is clicked or pressed, or the longer the duration for which the first object 110 is clicked or pressed, the greater the scales on the axes for mapping the data units may be made to increase the amount of deformation of the first object 110. This allows the user to adjust the magnitude of classification of the data unit.

The classification section 47 may give the pointer of the mouse 30 conditions on attribute information. Then, when the pointer is put near a first object 110 that includes a plurality of data units, the classification section 47 may deform the first object 110 according to similarities between the attribute information on the plurality of data units included in the data unit corresponding to the first object 110 and the attribute information given to the pointer. For example, the plurality of data units included in the data unit corresponding to the first object 110 may be mapped depending on their degrees of conformity or similarity to the conditions given to the pointer, whereby the shape of the first object 110 is determined according to that distribution. This makes it possible to classify data units included in a first object 110 according to the conditions given to the pointer. The amount of deformation of the first object 110 may be determined according to the distance between the pointer and the first object 110. For example, the amount of deformation of the first object 110 may be increased as the pointer approaches the first object 110.

(Data Separation)

The classification section 47 accepts an operation for instructing to separate part of the data units classified, and separates, from the data units corresponding to the first object, data units having attribute information corresponding to the separation-instructed part of the first object that is deformed according to the attribute information.

Figure 27:
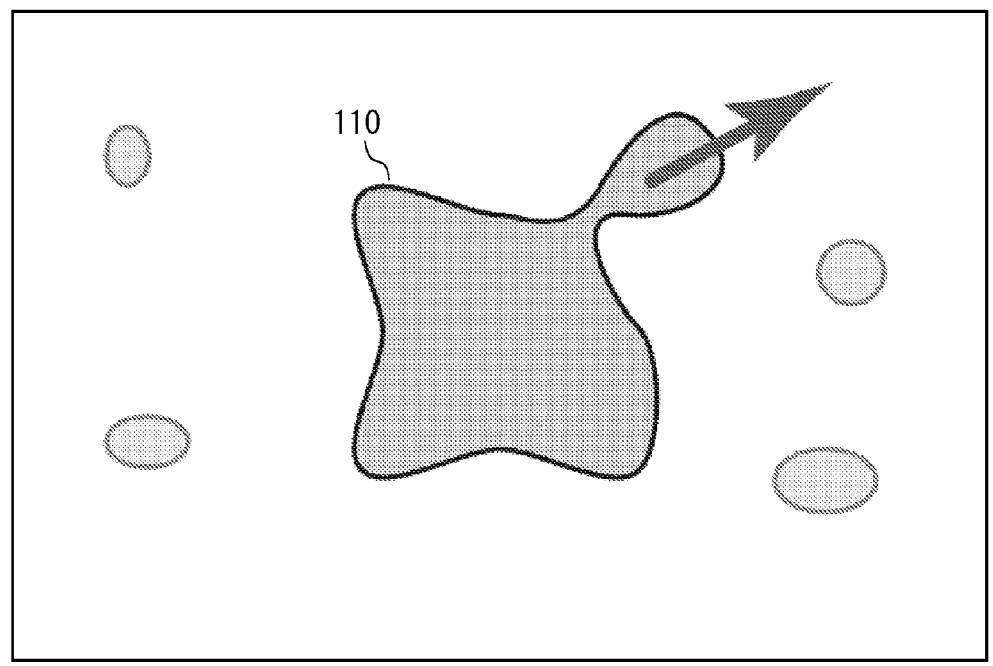
FIG. 27 is a diagram showing a screen which displays how data units are separated.

FIG. 27 shows a screen which displays how data units are separated. When the user drags part of the first object 110 corresponding to a data unit that includes a plurality of data units, the classification section 47 separates the data unit(s) corresponding to the dragged part from the data unit corresponding to the first object 110, thereby creating a new group. As shown in FIG. 26, the first object 110 is deformed by mapping the data files with a plurality of pieces of attribute information on axes. The classification section 47 thus separates the data unit(s) having attribute information within a predetermined range (set of coordinates) about the drag start point from the group corresponding to the first object 110. The mouse pointer or the like may be used to set the range of separation. The classification section 47 deletes the file IDs of the data files having attribute information corresponding to the separation-instructed part from the file ID fields 85 on the record of the group corresponding to the first object 110 in the group database 64. The classification section 47 also adds a new group to the group database 64, and adds the file IDs of the separated-out data files to the file ID fields 85 on the record of that group. The classification section 47 calculates and updates the attribute information on the group corresponding to the first object 110, and calculates and records attribute information on the newly created group. The user interface section 41 redisplays the first object 110, and also displays a first object corresponding to the newly created group.

The classification section 47 may determine the thresholds of the attribute information on the data units to be separated according to the speed of the operation. For example, when the mouse pointer is dragged quickly, the thresholds are raised so that data units corresponding only to locations near the edges are separated. With a slow drag, the thresholds are lowered to separate out more data units.

(Data Extraction)

The extraction section 48 accepts an operation for instructing to narrow down data units from a plurality of data units included in a data unit corresponding to a first object 110, based on conditions on the attribute information attached to the data unit. The extraction section 48 then releases data units that are low in their degree of conformity to the conditions, thereby extracting data units that are high in their degree of conformity to the conditions.

Figure 28:
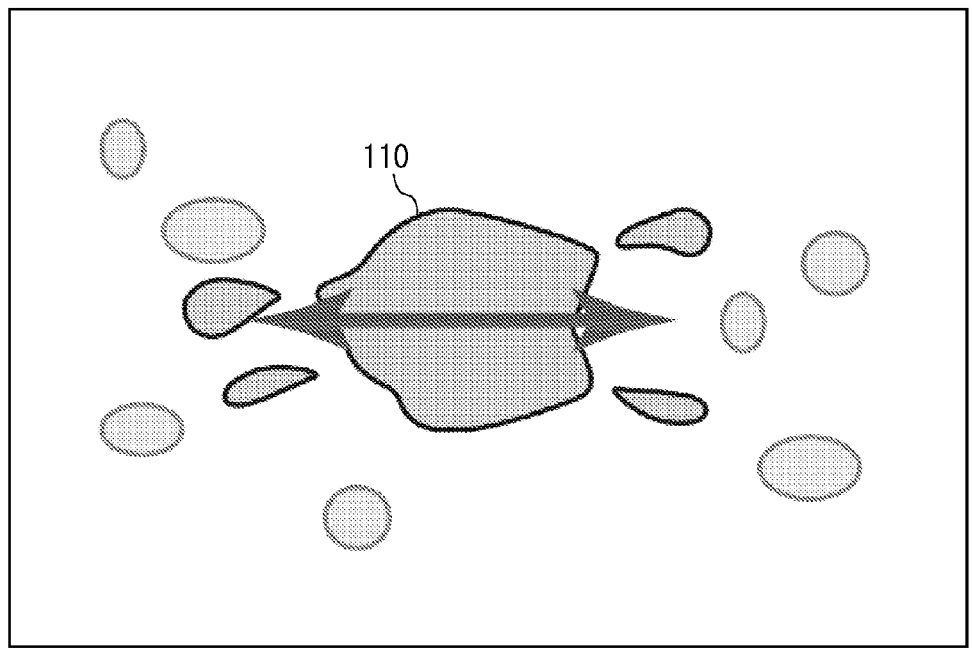
FIG. 28 is a diagram showing a screen which displays how data units are extracted.

FIG. 28 shows a screen which displays how data units are extracted. When the user drags the first object 110 so as to reciprocate or shake it, the extraction section 48 sorts out the data units according to their degree of conformity to given conditions. The extraction section 48 releases data units that are low in their degree of conformity to the conditions from the group corresponding to the first object 110, so that only data units high in their degree of conformity to the conditions remain in the group. When the operation for instructing to narrow down data units is made on a second object 112 that has data units collected, the extraction section 48 narrows down the data units according to the conditions given to the second object. When the operation for instructing to narrow down data units is performed on a first object 110 corresponding to a data unit that includes a plurality of data units, the extraction section 48 may extract data units conforming to or similar to the attribute information on the data unit corresponding to the first object 110. The extraction section 48 may alternatively accept the conditions for narrowing down data units from the user.

The extraction section 48 determines the thresholds of the attribute information for narrowing down data units based on the conditions, and separates data units that have attribute information lower in their degree of conformity to the conditions than the determined thresholds from the group corresponding to the first object 110. The extraction section 48 deletes the file IDs of the data files having the attribute information to be separated, from the file ID fields 85 on the record of the group corresponding to the first object 110 in the group database 64. At this point, the extraction section 48 may create a new group to contain the data units separated, or may simply release the data units from the group. The extraction section 48 calculates and updates the attribute information on the group corresponding to the first object 110, and calculates and records attribute information on the newly created group if necessary. The user interface section 41 redisplays the first object 110, and also displays a first object corresponding to the newly created group or the first objects corresponding to the respective data units separated.

The extraction section 48 may determine the thresholds of the attribute information on the data units to be extracted, according to the speed of the operation. When a first object 110 is reciprocated or shaken quickly, the extraction section 48 may raise the thresholds so that only data units high in their degree of conformity to the condition remain in the group for extraction. When the first object 110 is reciprocated or shaken slowly, the extraction section 48 may lower the thresholds so that data units low in their degree of conformity to the conditions also remain in the group. Consequently, the user can extract data units with an operational sensation resembling the sifting of data.

(Data Release)

The release section 49 accepts an operation for instructing to release a plurality of data units that are included in a data unit corresponding to a first object 110, and releases the grouping of the data unit corresponding to the first object 110.

Figure 29:
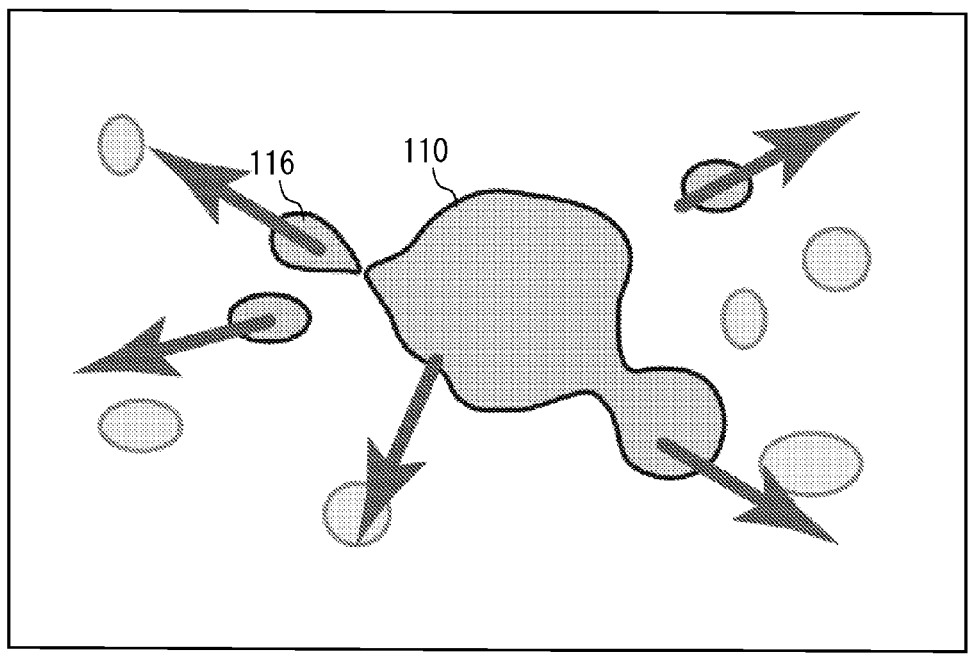
FIG. 29 is a diagram showing a screen which displays how data units are released.

FIG. 29 shows a screen which displays how data units are released. The release section 49 releases the data units included in the group corresponding to the first object 110 when the user performs any one of the following operations: clicking or pressing the first object 110 with a strength higher than or equal to a predetermined threshold; clicking or pressing the first object 110 for a period longer than or equal to a predetermined threshold; and dragging the first object 100 to reciprocate or shake it at a speed higher than or equal to a predetermined threshold. The release section 49 deletes the file IDs of all the data files from the file ID fields 85 on the record of the group corresponding to the first object 110 in the group database 64. The release section 49 may delete the record of the group corresponding to the first object 110. Here, as shown in FIG. 29, the release section 49 may display how the first objects 116 corresponding to the data units included in the data unit corresponding to the first object 110 pop out from the original first object 110. The user interface section 41 may erase the first object 110 from the screen, and display the first objects 116 corresponding to the data units included in the data unit corresponding to the first object 110 on-screen.

Figure 30:
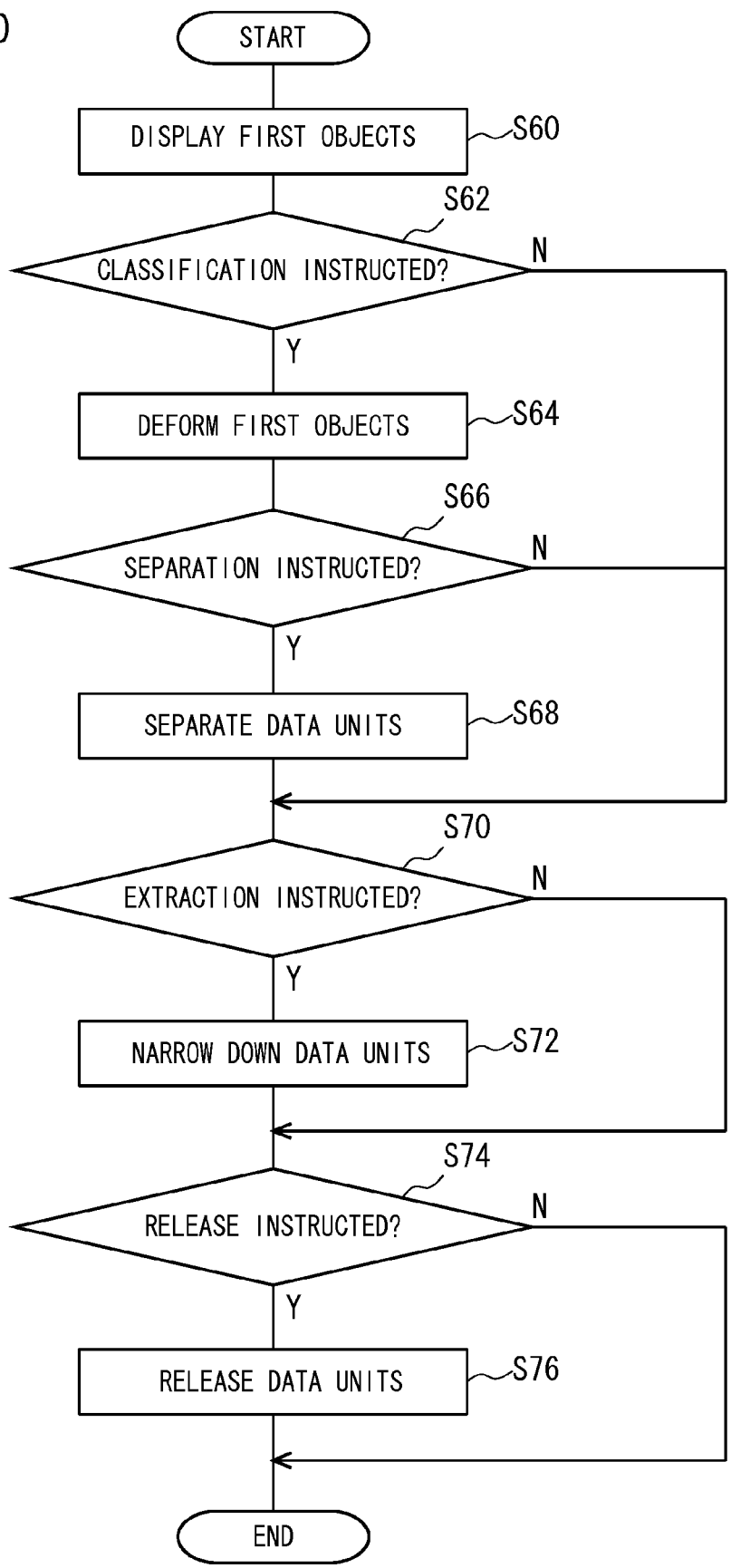
FIG. 30 is a flowchart showing steps of the data processing method according to the embodiment.

FIG. 30 is a flowchart showing steps of the data processing method according to the embodiment. In FIG. 30, the steps for classifying, separating, extracting, and releasing data are described. Initially, the user interface section 41 consults the file database 62 and the group database 64, and displays on-screen a first object corresponding to a group of a plurality of data files stored in the data file storing section 60 (S60). If instructed by the user to classify data (Y at S62), the classification section 47 classifies the data units included in the first object and deforms the first object (S64). Moreover, if instructed to separate data (Y at S66), the classification section 47 separates the data unit(s) corresponding to the designated part from the group corresponding to the first object (S68).

If instructed to extract data (Y at S70), the extraction section 48 narrows down data units to be included in the group corresponding to the first object according to predetermined conditions (S72). If instructed to release data (Y at S74), the release section 49 releases the data units included in the group corresponding to the first object from the group (S76).

The provision of such a user interface makes it possible to arrange data files appropriately and find desired data files when accumulating a large number of data files. Such technology is particularly useful when classifying and searching for data files according to ambiguous or vague conditions.

Up to this point, the present invention has been described in conjunction with the embodiment thereof. This embodiment has been given solely by way of illustration. It will be understood by those skilled in the art that various modifications may be made to combinations of the foregoing constituting elements and processes, and all such modifications are also intended to fall within the scope of the present invention.

What is claimed is:

1. A data processing apparatus having a processor, comprising:
 a data file storing section configured to store data files in a memory;
 a user interface section configured to, using the processor, assign first objects to data units, display the first objects on a display, and accept an operation from a user on the data units in a form of an operation on the first objects using an input device, the data units each being a data file or a group of a plurality of data files stored in the data file storing section; and
 a grouping section configured to accepts an operation for instructing to group a plurality of the data units,
 wherein, when the user makes an operation of moving a first object corresponding to a single first data unit not already grouped onto a first object corresponding to a single second data unit not already grouped, the grouping section groups those data units together and the grouping section creates a new first object showing only the first object corresponding to the single first data unit and the first object corresponding to the single second data unit inside of the new first object,
 wherein the grouping section determines a method of calculating attribute information on the group in accordance with locations of the first objects when coming into contact with each other.

2. The data processing apparatus according to claim 1, further comprising a group database which stores information on the group, and wherein
 the grouping section stores information for identifying the data units included in the group and the attribute information attached to the group into the group database in association with each other.

3. The data processing apparatus according to claim 1, wherein: if the data units to be grouped include at least one group of a plurality of data files, the grouping section adds the rest of the data units to the group; and if the data units to be grouped do not include any group of a plurality of data files, the grouping section creates a new group consisting of the data units.

4. The data processing apparatus according to claim 1, wherein the grouping section determines which to give priority to, the attribute information on the first data unit or the attribute information on the second data unit, based on the direction of contact of the first object when calculating the attribute information on the group.

5. The data processing apparatus according to claim 1, further comprising a classification section which accepts an operation for instructing to classify a plurality of data units included in a data unit, the operation being made on a first object corresponding to the data unit that includes the plurality of data units, and deforms the first object in accordance with distribution of attribute information on the plurality of data units included in the data unit corresponding to the first object.

6. The data processing apparatus according to claim 1, further comprising an extraction section which accepts an operation for instructing to narrow down data units from a plurality of data units included in a data unit corresponding to a first object, based on a condition on the attribute information attached to the data unit, and releases a data unit or data units that is/are low in a degree of conformity to the condition, thereby extracting a data unit or data units that is/are high in the degree of conformity to the condition.

7. The data processing apparatus according to claim 6, wherein the operation for instructing to narrow down is an operation of dragging the first object to reciprocate or shake it.

8. The data processing apparatus according to claim 7, wherein the extraction section determines a threshold of the attribute information on the data unit(s) to be extracted, in accordance with the speed of the operation.

9. The data processing apparatus according to claim 1, wherein the grouping section determines attribute data of the new first object by digitizing contents of data units contained within the new first object and attaches it to a data unit associated with the new first object based on pieces of attribute information attached to data units obtained by digitizing contents of the first data unit and the second data unit.

10. The data processing apparatus according to claim 9, wherein the grouping unit changes the mode of display of the new first object according to the attribute data of the new first object.

11. A data processing method comprising:
 assigning first objects to data units and displaying the first objects on a display, the data units each being a data file or a group of a plurality of data files stored in a data file storing section which stores data files;

accepting an operation from a user on the data units in a form of an operation on the first objects;

accepting an operation for instructing to group a plurality of the data units, when the user makes an operation of moving a first object corresponding to a single first data unit not already grouped onto a first object corresponding to a single second data unit not already grouped, creating a new first object showing the first object corresponding to the single first data unit and the first object corresponding to the single second data unit inside of the new first object, and wherein the grouping section determines a method of calculating attribute information on the group in accordance with speeds of the first objects when coming into contact with each other.

12. A non-transitory computer-readable recording medium having a data processing program product recorded thereon, the program comprising:

a module configured to assign first objects to data units and display the first objects on a display, the data units each being a data file or a group of a plurality of data files stored in a data file storing section configured to store data files;

a module configured to accept an operation on the data units in a form of an operation on the first objects; and a module configured to accept an operation for instructing to group a plurality of the data units, wherein, when the user makes an operation of moving a first object corresponding to a single first data unit not already grouped onto a first object corresponding to a single second data unit not already grouped, the grouping section groups those data units together and the grouping section creates a new first object showing only the first object corresponding to the single first data unit and the first object corresponding to the single second data unit inside of the new first object, and wherein the module configured to accept an operation for instructing to group determines a method of calculating attribute information on the group in accordance with directions of the first objects when coming into contact with each other.

* * * * *